United States Patent [19]
Li

[11] Patent Number: 6,144,954
[45] Date of Patent: Nov. 7, 2000

[54] AUTOMATIC DEVELOPMENT OF COMPUTER SOFTWARE

[76] Inventor: Chou H. Li, 8001 Sailboat Key Blvd., No. 404, South Pasadena, Fla. 33707

[21] Appl. No.: 09/014,435

[22] Filed: Jan. 27, 1998

[51] Int. Cl.$^7$ .................................................... G06F 17/00
[52] U.S. Cl. ................................. 706/62; 706/46; 706/61
[58] Field of Search ................................ 706/61, 62, 46; 395/712; 714/11

[56] References Cited

U.S. PATENT DOCUMENTS

| | | | |
|---|---|---|---|
| 3,460,096 | 8/1969 | Barron | 700/32 |
| 3,466,430 | 9/1969 | Hardaway | 700/32 |

(List continued on next page.)

OTHER PUBLICATIONS

Munson et al., "Optimization by Random Search on the Analog Computer", National Simulation Conf., Dallas, TX (Oct. 25, 1958).

D.L. Heiserman, "How to Build Your Own Self–Programming Robot", Tab Books: Blue Ridge Summit, PA (1979), pp. 202–205.

(List continued on next page.)

*Primary Examiner*—Kakali Chaki
*Assistant Examiner*—Anil Khatri
*Attorney, Agent, or Firm*—Hall, Priddy, Myers & Vande Sande

[57] ABSTRACT

A self-optimizing method and machine automatically develop computer software in real-time according a specified performance by computer-generating a knowledge base associated with the computer software, by instantly computer-coding the computer-generated knowledge base into the computer software, and by saving the developed computer software in a software storage device.

41 Claims, 3 Drawing Sheets

U.S. PATENT DOCUMENTS

| | | | |
|---|---|---|---|
| 3,519,998 | 7/1970 | Barron | 700/32 |
| 3,576,976 | 5/1971 | Russo et al. | 706/62 |
| 3,601,811 | 8/1971 | Yoshino | 706/25 |
| 3,694,636 | 9/1972 | Smith, Jr. | 700/149 |
| 3,705,409 | 12/1972 | Brayton et al. | 244/195 |
| 3,794,271 | 2/1974 | Barron et al. | 244/195 |
| 4,368,509 | 1/1983 | Li | 364/513 |
| 4,472,770 | 9/1984 | Li | 706/62 |
| 4,495,559 | 1/1985 | Gelatt, Jr. et al. | 700/28 |
| 4,517,468 | 5/1985 | Kemper et al. | 706/62 |
| 4,525,775 | 6/1985 | Eydelman | 364/148 |
| 4,649,515 | 3/1987 | Thompson et al. | 364/600 |
| 4,658,370 | 4/1987 | Erman et al. | 364/513 |
| 4,697,242 | 9/1987 | Holland et al. | 706/13 |
| 4,710,864 | 12/1987 | Li | 706/62 |
| 4,829,450 | 5/1989 | Manthey | 706/62 |
| 4,910,660 | 3/1990 | Li | 706/62 |
| 4,935,877 | 6/1990 | Koza | 706/13 |
| 5,079,690 | 1/1992 | Li | 706/62 |
| 5,136,686 | 8/1992 | Koza | 706/13 |
| 5,148,513 | 9/1992 | Koza etal. | 706/13 |
| 5,263,120 | 11/1993 | Bickel | 395/500.28 |
| 5,410,634 | 4/1995 | Li | 706/62 |
| 5,487,134 | 1/1996 | Ballard | 706/45 |
| 5,842,193 | 11/1998 | Reilly | 706/45 |
| 5,905,977 | 1/1999 | Gaubault | 706/46 |
| 6,003,143 | 12/1999 | Kim et al. | 714/38 |
| 6,006,213 | 6/2000 | Yosida | 706/14 |
| 6,061,675 | 5/2000 | Wical | 706/45 |
| 6,073,126 | 6/2000 | Endo et al. | 706/45 |

OTHER PUBLICATIONS

C.H. Li, "Worksheet Gives Optimum Conditions", Chemical Engineering, McGraw–Hill: New York (Apr. 7, 1958).

J.O. Ramsay, "A Family of Gradient Methods of Optimization", The Computer Journal, vol. 13, No. 4 (Nov. 1970), pp. 413–417.

R.F. Service, "Training Lasers to Be Chemists", Science, vol. 279 (Mar. 20, 1998), pp. 1847–1848.

C.H. Li, "A Sequential Method for Screening Experimental Variables", American Statistical Association Journal, vol. 57 (Jun. 1962), pp. 455–477.

Munson et al., "Optimization by Random Search on the Analog Computer", National Simulation Conf., Dallas, TX (Oct. 25, 1968).

"Process Integration Remains Key To Semiconductor Wafer Profits", R&D Magazine (Jun. 1994), pp. 18–20.

"WaveRider Product Information", Biofeedback Instruments Co., 255 West 98th Street, New York, NY, 10025.

Chen, "A rule based/task modeling approach", ACM pp 281–292, Jan. 1986.

Warshaw wt al, "Rule based query optimization Revisited", CIKM ACM pp 267–275, Jan. 1999.

Vossos et al, An example of integrating leagl case based reasoning with object orienetd rule based systems: IKBALS II, ACM, pp 31–41, 1991.

Su et al., KBMS based evolutanary prototyping of software systems, IEEE, pp 80–90, 1997.

Oleary et al, "Artificial intellgence and virtual organization", Comm. of the ACM, vo. 40, No. 1, pp 52–59, Jan. 1997.

Atolagbe et al, "A generic architecture for intelligent instruction for simulation modeling software package", winter simulation conf. pp 856–863, 1996.

Matthews et al, "Improving the performance of log structured file system with adaptive methods", SOSP ACM pp 238–251, Oct. 1997.

Benyan et al, "Developing adaptive systems to fit individual aptitudes", Intelligent user interface, ACM pp 115–121, Jul. 1992.

AUTOMATIC DEVELOPMENT OF COMPUTER SOFTWARE

BACKGROUND OF THE INVENTION

1. Field of the Invention

This disclosure relates generally to the field of self-optimizing methods and machines, and in particular to a multi-variable, real-time self-optimizing method and machine, for operation in practical or non-ideal conditions and used to automatically develop computer software.

2. Description of Related Art

Computer-controlled automation systems are widely used. These systems are extremely powerful. With their uses, consistency is achieved together with the usually, but not necessarily always, associated improved profits, productivity, and product or service qualities ($P^3Q$).

Further, by transferring to machines human intelligence, rather than skill, these systems have ushered us into a Second Industrial Revolution.

But human intelligence or knowledge bases only document averaged previous results on old samples with design, equipment, materials, parts, procedures, or environment different from the present or future results. Inherent are errors due to the various samplings, assumptions, or extrapolations, and repeated human interactions. These knowledge bases are often incomplete, inaccurate, biased, erroneous, out-of-date, and/or too generalized for uses in a particular automation task with a specific combination of design, equipment, procedures, materials, parts, and environment.

Detailed knowledge bases on modern technologies are particularly lacking. Even many old technologies are not fully mastered or understood. Each of these technologies involves many processing steps often with unknown chemical, mechanical, electromagnetic, aerodynamic, fluidic, or other phenomena on the subatomic, atomic, microscopic, macroscopic, or other levels. Even the controlling variables in each phenomenon are often not completely known, and certainly have not been comprehensively studied. In fact, much research and development (R&D) remains to be done in every field. Yet time is very short in this highly competitive world. A new R&D method must, therefore, be developed.

For example, system dynamics of modern processes and equipment are generally ill-defined. Chemical and metallurgical reactions are often uncertain. The mechanism of catalysis is not completely known. Crystal growth is still an art. After millions of controlled welding experiments, the critical variables in the all-important welding process cannot yet be even identified among the very many possible variables. In the case of the new high temperature ceramic superconductors, the samples are still somewhat hard to make, shape, purify, reproduce, isolate, stabilize, confirm, or even determine compositions.

Without reliable knowledge bases, the usual automation specialists would be at a loss in selecting the few among many manufacturing or servicing phenomena or variables to be controlled, as well as in formulating the system dynamics models, in setting up the control equations, in determining the control constants, and in specifying setpoints for the control variables.

The fragile and unreliable knowledge bases often give only partial or invalid system dynamics models, oversimplified control equations, and inexact or misleading control constants and setpoints. In addition, all the setpoints are too arbitrary and round-numbered (e.g., 800° C. and not 796.768° C., 3 feet per minute, 20 gallons) to be possibly optimal statistically. The chance of these variables or setpoints being optimal at any time, not to say instantaneously or continuously, is close to zero. The optimal setpoints cannot be constant, and are assumed in prior art automation systems, unless one assumes no effect due to changes or variations in time, equipment, procedures, materials, parts, and environment.

These conventional automation systems are also not smart and must be spoon-fed at every step via computer programs or master-slave instructions. They are not totally integrated or automated, and require constant human guidance, reviews, analyses, interactions, and supervision.

Due to this repeated human involvement, the conventional automation systems not only are greatly slowed down, but inevitably inherit the many defects of the inconsistent and imperfect human programmers, test planners, samplers, testers, data collectors and analyzers, communicators, and technicians. Humans are million times slower and less reliable than microprocessors in, e.g., memory recalling or storing, information inputting or outputting, data analyzing, communicating, and commanding or actuating.

In addition, usually these prior art systems merely passively adapt, adjust, correct, control, or regulate, in response to variations in the environment or a few control variables. Dealing with more than several interacting variables results in an extremely large number of tests to be made; and in a massive amount of data to be collected, conditioned, stored, and quickly or instantly analyzed. This is often impractical or impossible, because of the well-known problems of "combinatorial explosion" and "computer intractability," as has been described in the U.S. Pat. No. 4,710,864.

Yet, modern technologies invariably involve many unpredictable, interacting, and rapidly changing control variables in such categories as: design, material vendors, batches, lots, and conditions; compositioning; processing equipment; procedures in each of the many steps; and environment. Many phenomena are transient but highly non-reproducible yet are critical and need to be known and/or understood.

Process integration of optimization remains key to many modern processes. Process interaction and an extremely competitive market and environment make, e.g., semiconductor manufacture one of today's most daunting technological challenges. The profitable manufacture of advanced microelectronic circuits requires knitting together hundreds of process steps needed to make a single wafer. Each process step must be optimized not only to accommodate preceding and subsequent processes, but also to account for minute influences specific to the wafer itself. It is a complicated effect, and made even more so by the presence of the edge of the wafer and other seemingly trivial effects due to circuit pattern density, wafer position effect, and procedures and materials used in previous or subsequent processing steps. Many previously neglected variables on designs, materials, procedures, equipment, and environment must always be systematically optimized and controlled.

Artificial intelligence (AI) technologies, particularly expert systems and the neural networks, have been developed and increasingly used in various fields. But again the knowledge bases are often inadequate or deficient, particularly on developing technologies. The prior art expert systems are also costly, inflexible, qualitative, and often inaccurate and out-of-date particularly for complicated yet rapidly improving modern technologies. In addition, they too cannot handle the inherently large number of interacting variables.

Reliable and relevant knowledge is scarce and very costly. Up to now, the main bottleneck in the development of expert systems has been the acquiring of the knowledge in computer-usable form. Human knowledge often not only is fragile, costly, unreliable, but also difficult to be translated for use by machines. Codifying an expert's skill has always been a long and labor-intensive process.

Hence, experts conclude that machine learning is the key to the future of automation in general and to expert systems in particular. The valuable knowledge must be manufactured instantly, in bulk, and at low cost. So far, however, no such machines exist.

Conventional AI development environments experience difficulties in producing efficient real-time systems. This is due to the fact that the same code necessary to enhance the development environment tends to slow down the system during run-time. To overcome these limitations, AI system designers must embed a knowledge base (KB) into their own custom run-time AI shells to achieve real-time performance. Unfortunately, the deeper the KB is embedded into the actual code for improved performance, the harder it is to change the KB when maintenance is necessary. Therefore, the AI system designer must constantly balance system performance versus ease of maintaining and manipulating the KB. An automation system with real-time KB generating capacity would thus be highly desirable.

Prior art automation systems also invariably contain various hidden errors of samplings, assumptions, extrapolations, scaling-ups, and statistical fluctuations of uncertain magnitudes. These systems are also at the mercy of other errors due to, e.g., miscalibrated sensors, imperfect actuators, drift or instability in equipment, and partially damaged components. Any one of these errors can easily lead to unexpected inconsistencies in, e.g., manufacturing or servicing results.

Li has various U.S. patents on self-optimizing method and machine, for example, U.S. Pat. Nos. 4,368,509, 4,472,770, 4,710,864, 4,910,660, 5,079,690, and 5,410,634, each of which is incorporated herein by reference. These patents describe various self-optimizing methods and machines. Still, much remains to be done on automation in general-and on self-optimization in particular.

Accordingly, an object of the present invention is to provide improved a self-optimizing method and machine.

A further object of the invention is to provide a real-time self-optimizing method and machine capable of handling tens, hundreds, thousands, or more variables with minimum human guidance.

Another object of this invention is to provide a closed-loop, self-optimizing method and machine which can optimize practically continuously and instantly.

A broad object of the invention is to provide a self-optimizing method and machine which can self-plan controlled tests to be performed on the very particular method and machine itself without relying on many assumptions, scaling-up laws, and extrapolations from sampled test results obtained on other similar methods and machines; with the test data instantly analyzed for timely optimization results.

Another object of the invention is to provide a self-optimize method and machine in practical or non-ideal conditions by tolerating, neutralizing, or suppressing the effect of errors due to defective knowledge bases, miscalibrated sensors, imperfect actuators, drifting equipment, damaged components, and statistical fluctuations.

A further object of the invention is to provide a self-optimizing method and machine which operates with deficient and minimal or practically zero knowledge bases, which rapidly generates its own new knowledge bases through automatic R&D, and which immediately and continuously replaces these new knowledge bases with still newer and more accurate knowledge bases for continuously optimal results.

An additional object of the invention is to provide a self-optimizing method and machine which actively computes and automatically sets the instantaneous optimal combinations of the many relevant variables in various categories, with instant feed-back to supply data for immediate replanning, retesting, and re-optimizing, all without human intervention.

Another object of the invention is to manufacture, in bulk and at low cost, reliable knowledge bases for the instant computer-coding and development of relevant expert systems.

Yet another object of the invention is to provide a self-optimized computer system software and service for businesses, offices, education, training, engineering, reverse-engineering, designing, processing, manufacturing, distribution, R&D, communication, reconnaissance, surveillance, project management, data analyses, decision making, running supercomputers or parallel computers, multimedia computing or networking, electronic data interchanging, computer operations and applications, and other applications.

A further object of the invention is to provide computer-generated software or entities, such as software objects, which, all by themselves and with blinding speed, reproduce or multiply, mutate or undergo spontaneous genetic changes in the best possible way under a given environment.

Further objects and advantages of my invention will appear as the specification is described herein.

SUMMARY OF THE INVENTION

In summary, the present invention provides a method for real-time self-optimizing, with instant or substantially continuous, closed-loop feed-back control without human guidance, intervention, and interaction, by automatically, instantly, repeatedly, and preferably continuously: planning an efficient, statistical design matrix of n tests on m variables with n being much less than $2^{(m-4)}$ power (e.g., for m=7, $\frac{1}{8}$ replicated and requiring only one eighth) of the normally required tests for the complete, m-variable factor experiment, adjusting the conditions of the m variables according to the design matrix; performing the necessary tests; collecting and recording the n sets of data on the critical performances to be optimized; analyzing the collected data to determine the functional relationships between the m variables and the critical performances and to obtain the instantaneous optimal variable combinations; setting the m variables to the thus-computed optimal combinations before these combinations change; and feeding back information on the status of optimization to achieve closed-loop feed-back control. The knowledge bases so generated are instantly machine-coded. A machine operating on the basis of this method is also disclosed.

BRIEF DESCRIPTION OF THE DRAWINGS

The features and advantages of the disclosed automatic computer software development system and method are readily apparent and are to be understood by referring to the following detailed description of the preferred embodiments of the present invention, taken in conjunction with the accompanying drawings, in which.

DESCRIPTION OF THE PREFERRED EMBODIMENTS

Figure 1:
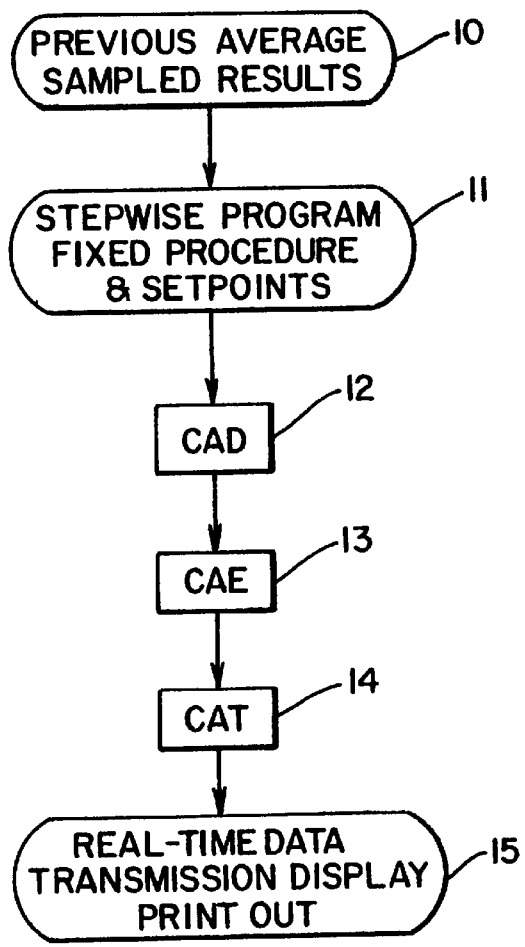
FIG. 1 shows a flowchart of prior art automation systems.

Referring in specific detail to the drawings, with common reference numbers identifying similar or identical elements, steps, and features, as shown in FIG. 1, the present disclosure describes an automatic computer software development system and method, being of general applicability, for self-optimizing many and various automation systems and processes, in real-time and with lightning speeds in the dealing of the many variables, which normally require thousands, millions, billions, or more computational steps.

FIG. 1 shows a flowchart of prior art automation system. Note that these systems totally depend on the imperfect and error-prone human knowledge bases from averaged previous sampled results. Also, there are no mechanism to eliminate, suppress, or even detect errors from any sources. Hence, errors in, errors out (EIEO), similar to the notion of garbage in, garbage out (GIGO).

As shown in FIG. 1, a prior art automation system performs the steps of obtaining previous average sampled results in step 10, operating a stepwise program using a fixed procedure and setpoints in step 11, performing computer aided design (CAD) in step 12 on the resulting data from step 11; performing computer aided engineering (CAE) in step 13 on the computer aided design results from step 12; performing computer aided testing (CAT) in step 14 to test the computer aided engineering results in step 13; and generating a real-time data transmission in step 15, such as a display or print-out.

Thus, a fundamental flaw in prior art automation systems is the assumption that there exist human experts who know exactly and accurately everything: the exact number and type of important variables and their interactions, system dynamics models, detailed solutions of the intricately coupled, partial differential control equations, exact control constants, and optimal setpoints. Also, these experts and all the other personnel related to the automation are not assumed to make errors. In reality, this is far from the truth.

As a result, wrong models based on incomplete or imperfect understanding often must be used, with misleading, dangerous, or disastrous result. Classical examples include the Space Shuttle Challenger disaster, the Korean Airline KAL 007 shoot-down, the Chernobyl reactor failure, and Napoleon's and Hitler's Russian invasions. In the last example, Napoleon and Hitler respectively gathered French, German and other experts to help program the step-by-step operational procedures for each leaders human and mechanical agents, based on meticulously collected massive, accurate, scientific, but misleading previous sampled weather data, with disastrous results to each leader's whole army on the Eastern Front with Russia.

Figure 2:
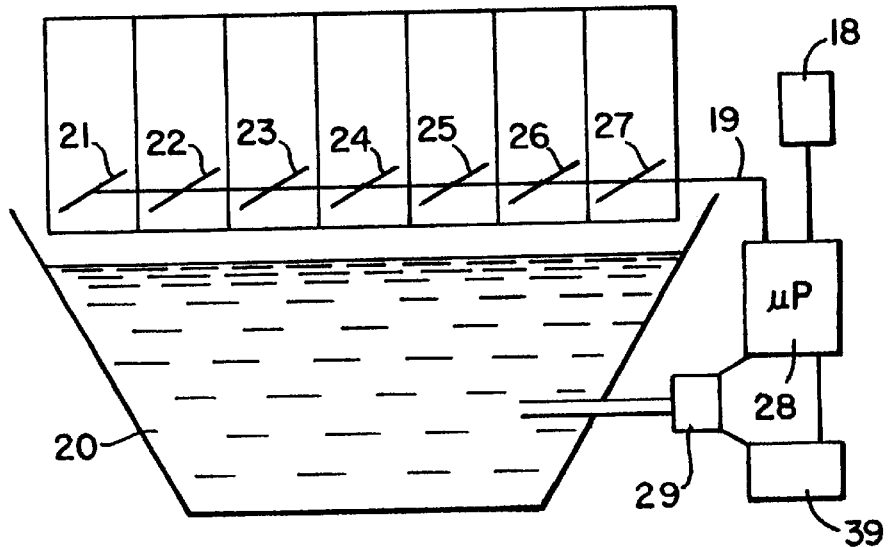
FIG. 2 shows a self-optimizing furnace for making special iron-based alloys.

FIG. 2 shows a machine 20 accordingly to the disclosed invention in the form of a furnace to make special iron-based alloys. The furnace self-optimizes, in real-time, relative to a specific performance, e.g., hot tensile strength of the resultant alloy produced on the furnace, in response to variations in a fixed number m of variables. For ease of illustration, m is only 7 and all these 7 variables are for 7 alloying elements. The composition of these seven alloying elements can be changed by automatic computer control. These variables are continuous variables.

This machine or furnace has a built-in microprocessor ($\mu$P) such as a "PENTIUM" microprocessor available from "INTEL", which first self-plans a statistical design matrix of operating or alloying conditions for the automatic R&D according to, e.g., the method and computer program given in the U.S. Pat. No. 4,368,509 incorporated herein. Specifically, 8 tests or alloying compositions are planned.

A complete seven-factor (at two levels each) experiment normally requires of $2^7=128$ tests. The computer-planned fractional factor experiment makes only 8 tests. That is, only a small fraction (i.e., one-sixteenth) of the required number of 128. Technically, this is called a one-sixteenth fractional factor experiment.

The microprocessor then directs, through the telecommunication transmission line 19, or alternatively a fiber optic or wireless channel, the seven actuators or alloying element feeders 21–27 to feed rapidly according to the design matrix. The furnace then sequentially makes the n=8 successive tests or melts of iron-based alloys, which are sampled by sampler 29 and tested on tester 39. The test results on the critical product performance, i.e., hot tensile strength of the resultant alloys, are transmitted, also by telecommunication lines, to the microprocessor 28, with attached memory 18 to compute, as shown in the U.S. Pat. No. 4,368,509, the desired functional relationships including: effects of the various variables or alloying elements, the instantaneous optimum combination of the variables, the interaction between variables, the time-serial variation of the effect of variables, and the steepest ascent path (or alternatively a maximum and/or minimum gradient path such as a steepest descent). The microprocessor 28 then redirects the feeders 21–27 to provide the optimum combination of the alloying elements into the molten iron melt in the furnace 20 for optimized alloy manufacture. Periodically, i.e., every half-hour, minute, or second, the planning, sampling, testing, data analyzing, and feeders are actuated and set, and this process is repeated so that the furnace conditions are always maintained in an optimal state. Other details of the principle, operation, and results of the self-optimizing method and machine are provided in my various patents mentioned above, publications, and reference U.S. patents and applications elsewhere incorporated herein.

Minor modification of the above self-optimizing machine yields a drug-searching or administering machine-for a living object, such as human, animal, plant, bacterium, virus, etc. This machine continuously self-optimizes to dispense the instantly optimum combinations of feeding drugs such as chemicals, plants, animal tissues, bacteria, genetic or biochemical materials, etc. through the feeders 21–27 into a drug-preparing or feeding device. Such a device, in the form of hypodermic needle, mouth-feeder, or implanted feeder, dispenses the optimum combination of drugs either periodically or continuously.

Machines are readily available to feed food, nutrients, vitamins, or even educational or training materials as control variables to plants, bacteria, animals, or humans with optimal equipment, procedures, and environment to achieve self-optimized physical or mental growth conditions of the object at all times. The environmental variables may also include: lighting, temperature, humidity, smell; pressure on the entire or selected portions of the object or entity including hot or cold breeze, jets or wind; noise or musical types, intensity, and tempo sounds; brain-teasing, mind-relaxing, muscle-exercising material or equipment; encouraging rewards; and other factors that stimulate the object physically, mentally, psychologically, or physiologically. As shown later, computer-connected biofeedback or neurofeedback equipment or devices may be used as sensors to monitor, or actuators to actuate, the mental or physical or physiological conditions of the patent, student, or object in these applications.

The same tester 29, used in conjunction with a proper, sampling machine such as another hypodermic needle, is used here to test, continuously and in real-time, the medical or growth conditions of the object as to, for example, chemistry of the blood, urine, body fluid at selected locations, and other liquids; blood pressure and pulse rate, or other control variables or performances to be optimized. Some of these growth, medical, chemical, and physiological parameters may be sensed or monitored as the input or control, or output or controlled, variables, to self-optimize one or more of these same parameters as the output or controlled variables. Many biochemical reactions in, or related to, these same parameters, or even growth progress or functions of the patient's vital organs may be sensed or monitored by, e.g., real-time x-ray, nuclear magnetic imaging, or other instruments.

Other medical and sickness treating instruments based on biofeedback methods are already widely is use. For example, Biofeedback Instruments Co. at 255 West 98th Street, New York, N.Y. 10025 has a WaveRider application for reading, processing, displaying, and playing the body's biological signals. It measures and displays any combination of these biosignals: brainwaves, skin conductance and other skin response measurements such as GSR, temperature, muscle tension, and heartbeat. Their software, WaveWare 1.0, a "MICROSOFT WINDOWS"-based program, controls sound cards or MIDI-compatible boards to provide over 100 different sounds. These commercial hardware and software have already been successful in the effective treatment of: migraine headaches, tension headaches, anxiety, panic/anxiety attacks, Temporomandibular joint dysfunction, blood pressure disorders, Raynaud's disease, and chronic pain. Li's self-optimizing method and machine disclosed herein, used in such applications, further improve the speed, reliability, cost, and productivity of such systems. Another biofeedback instrument company is Biofeed Back Systems, Inc. of 2736 47th St, Boulder, Colo. 80301.

Even pressure on the entire portion or a selected portion of the human or animal body, due to wind or physical contact, may be important. The shape, dimensions, materials of constructions, etc., of the clothing or foot wear may make a student feel relaxed, annoyed, hurt, thereby affecting the comfort level or learning efficiency of the student. According to Chinese medicine, pressure on selected "accupressure points" on the body may even relieve severe pain to enhance the learning efficiency. Selected pressure actuators, or special pressure pads, applied onto the most effective-accupressure points on the body, through specially designed shape, dimensions, materials of constructions, etc., at several or many points of the student's clothing or foot wear, are considered to relax and improve the learning. An optimum pressure profile and distribution can be achieved with the disclosed self-optimizing method and machine.

Figure 5:
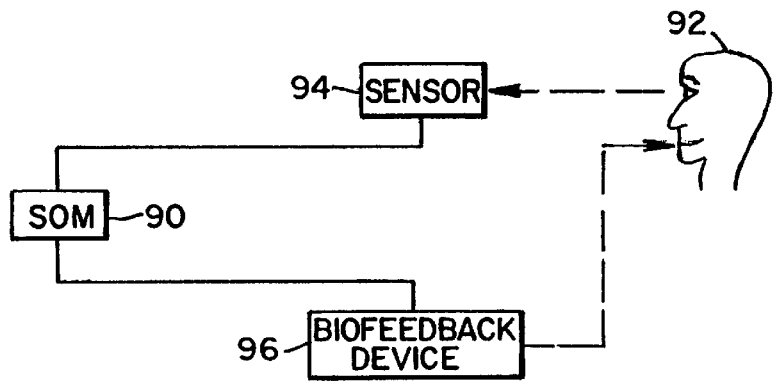
FIG. 5 illustrates a first use of the disclosed self-optimizing machine for human improvement applications.

All these new commercially available medical, diagnostic, and biofeedback instruments can be easily and rapidly connected electronically to the computer of the disclosed self-optimizing method and machine. For example, as shown in FIG. 5, a self-optimizing machine (SOM) 90 may be implemented in a processor and/or a computer system for use by a human subject 92. Data from a sensor 94 processing physiological data from the human subject 92 is provided to the SOM 90, which self-optimizes to generate signals to a biofeedback device 96 to improve the performance of the human subject, for example, in memory, stress management, etc.

Such biofeedback instruments have already been successfully used to improve the mental, physical, physiological conditions of test objects, even with conventional automation techniques. By applying the disclosed self-optimizing method and machine, quantum jumps in efficiency occur. The use of biofeedback instruments described above can even optimize the status of the brain (waves), heart, muscle (tension), and skin (temperature), etc., to achieve further improved or optimal relaxation, learning, sickness curing, and other results.

A self-optimizing computer program has been developed to teach mathematics. This program is based on the observations by education experts Dr. R. Dunn et al that learning cannot be effective or even relevant if the students, learning styles are not addressed. Each student's learning style depends on the learning topic, design, materials, and procedure, learning environment, student's sex, age, family background, time of the day or week, but such factors are generally unknown. A dynamic learning system must be developed to perform continuous educational R&D to continuously determine the instantaneous learning style of the student, and to compute and always to be set at the optimum variables combination. By having the student continuously achieving the best learning style, and by keeping the student in the optimally relaxed (as measured by brain wave activity, skin conductance, blood pressure, pulse rate) yet concentrated state of mind (as measured by, e.g., a mixture of alpha, beta and theta brain waves), the student, whether learning mathematics, science, reading, singing, sports, etc., excels in almost any physical and mental activities. These activities, including learning and training, may thus be optimized with the disclosed self-optimizing method and machine with the aid of modern biofeedback or neurofeedback instruments.

This first self-optimizing learning program optimally teaches addition, subtraction, multiplication, and division to the student, regardless of his or her age, sex, background, physical and mental condition, time of the day or week, or other factors. In this program, the computer serves both as the actuator to give the numbers to be handled by the student, and also as the sensor to sense the speed of the mathematical operation and accuracy of the results. The number of digits in the numbers are automatically increased and decreased according to these speed and accuracy optimizing criteria on, for example, a 50:50, 60:40, or 40:60 weighing ratio. In addition, the window size and background color of the monitor, location, size, and color of the numbers on the monitor, the intensity of the colors, environmental factors such as room lighting, temperature, humidity, and air circulation, video and audio signals, protocols encouraging rewards in words or pictures when correct answers are given, and other learning variables can be systematically varied in designed experiments to determine and set at the instantaneous optimal combinations of variables for the best learning results.

Figure 3:
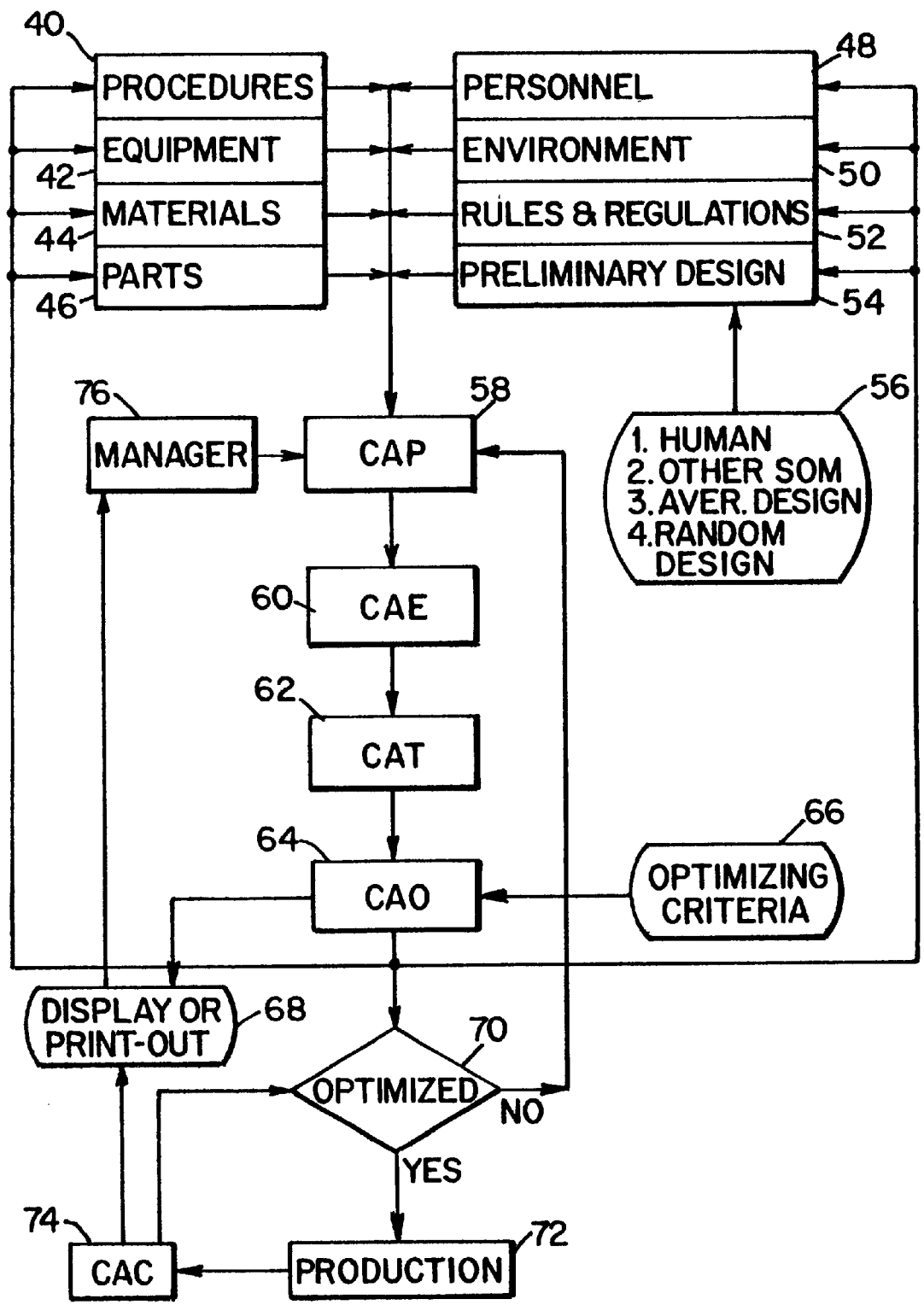
FIG. 3 shows a flowchart of my self-optimizing machine and method.

The disclosed invention is thus useful to self-optimize, in real-time, the physical or mental growth activities of a living being selected from the group consisting of human, animal, bacteria, virus, and plant. Such activities include: body growth, physical strengthening and improvement, sports, learning various skills such as speaking, singing, reading, memorizing, swimming, foreign languages, and other subjects. The flowchart of FIG. 3 is equally applicable in all these cases even with the same microprocessor and basic computer programs for the CAP, CAE, CAT, and CAO steps, as described above and in the U.S. Pat. No. 4,368,509. The sensors and actuators used, however, are generally different from those used in the self-optimizing furnace of FIG. 2. The specific performance or activity used as the optimizing criteria will, of course, also vary depending on the activities involved ranging, e.g., from learning speed, comprehension, growth rate, sickness recovery, to others, as is well known to the skilled person. The controlled variables also may include growing, training, sickness treating, and educating procedures; training or growing materials (food, books, recorded tapes, etc.); parts; and environment (such as temperature, humidity, noise or music type, intensity, and tempo, etc.).

The performance of human mental activities such as innovation, invention, creating, thinking, hypothesizing, etc. can also be measured by, e.g., the quality, cost, and expected economic impact as a result of such activities. Medical recovery progress are also definable by measuring the closeness of the patient's condition, such as blood pressure, pulse rate, body temperature, etc., to the average standard values.

To self-optimize in real-time the learning process of a human subject such as a child, one may, according to the description given above and in the U.S. Pat. No. 4,710,864, sequentially cause or direct the human to do the specific learning activity n times in succession while the conditions of the m selected control variables are simultaneously changed according to a design matrix. The m variables may relate to the learning equipment, design, materials, parts, procedures, and environment, while the optimizing criterion may relate to the speed and comprehension of learning directly measured and scored by the microprocessor. The microprocessor often can serve as the processor, sensors, and actuators to achieve practically instantaneous self-optimizing results.

Similarly, in a self-optimized growth or development process of objects such as human, animal, bacteria, plant, or even software for computer operation or application, the object or entity is caused to develop (i.e., grow, improve, mutate, or optimize) in n different tests by suitably actuating the m growth variables according to the design matrix and FIG. 3. The specific performance to be optimized here is usually the easily measurable growth rate, maximum growth, cost per given growth, and environment impact.

As shown in FIG. 3, the disclosed self-optimizing method and machine (SOM) operate according to the steps of obtaining data and specifications associated with procedures in step 40, equipment in step 42, materials in step 44, parts in step 46, personnel in step 48, environment in step 50, rules and regulations in step 52, and preliminary designs in step 54. Such data and specifications may be obtained from external sources such as sensors, transmissions from data sources and/or network connections such as the Internet and/or other databases. In particular, the preliminary design may be obtained in step 54 by receiving in step 56 data and specifications from a human operator, another SOM, a pre-specified average design, and/or a randomly generated preliminary design.

The data and specifications from steps 40–54 are processed by a computer aided (or automated) planning (CAP) procedure in step 58 to generate a plan. The plan is then implemented in step 60 by a computer aided (or automated) engineering (CAE) procedure to generated an engineered result, which is then tested in step 62 by a computer aided (or automated) testing (CAT) procedure. The test results from step 62 are then processed in step 64 by a computer aided (or automated) optimization (CAO) procedure, to generate an optimization of the received data in step 40–54 to form an optimal knowledge base.

The optimization is then sent from the CAO step 64 to feed back the information thereof to the steps 40–54. The optimization is also sent to an output step 68 for display or print-out by the disclosed self-optimizing method and machine. The optimization is also sent to an evaluation step 70 to determine if the optimization generated by the CAO step is indeed optimized. If not, the disclosed self-optimizing method and method loops back to repeat steps 58–64 using the data from step 40–54, including the data of the optimization feed back thereto from step 64.

If the optimization is indeed optimal, as determined in step 70, the optimization specifying an optimal knowledge base is then produced in step 72, and checked in step 74 by a computer aided (or automated) checking (CAC) procedure. The results of the checking in step 74 are then sent to the output step 68 to indicate to an automation manager in step 76 that an optimal knowledge base has been produced. Optionally, the CAC procedure may verify that the produced and checked knowledge base is indeed optimal by sending the produced knowledge base to the evaluation step 70 for verifying the optimization.

After the CAC step 74, the optimal knowledge base may then be output through step 68 to the automation manager in step 76. The automation manager may then use the optimal knowledge base. Alternatively, the automation manager may adjust the CAP in step 58 to obtain different or better results.

Figure 4:
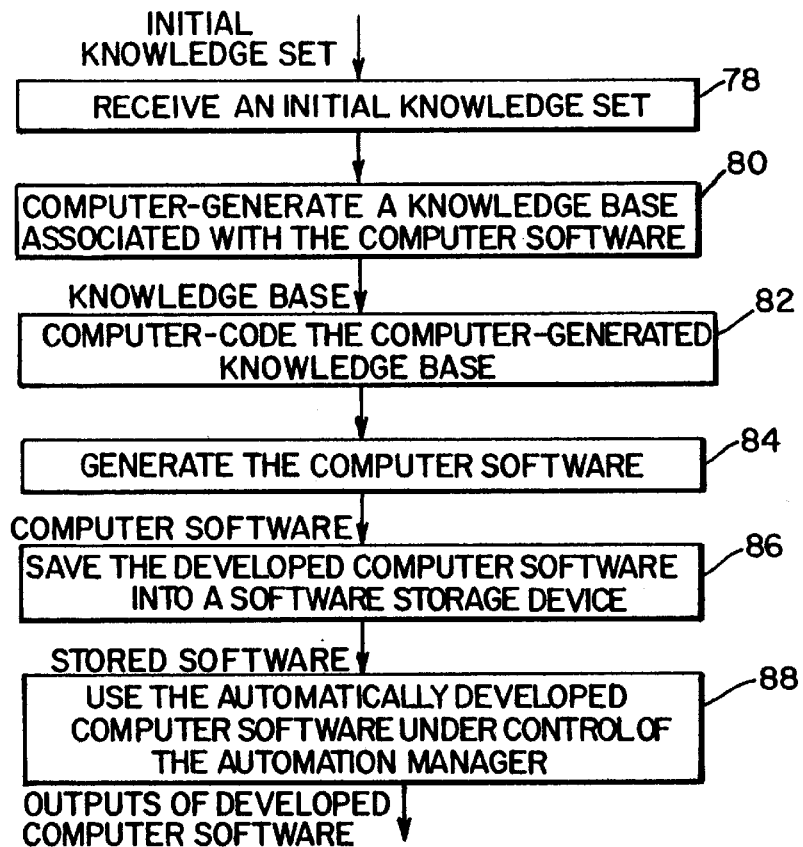
FIG. 4 shows the operation of the disclosed self-optimizing machine, for example, to automatically develop computer software.

FIG. 4 shows the procedural steps for the disclosed self-optimizing method and machine used, for example, in the automatic development of computer software. As shown in FIG. 4, the self-optimizing method includes the steps of receiving an initial knowledge set in step 78 to be associated with the computer software; computer-generating a knowledge base associated with the computer software in step 80; instantly computer-coding the computer-generated knowledge base in step 82 to generate the computer software in step 84; saving the developed computer software into a software storage device such as a memory in step 86; and using the automatically developed computer software under control of the automation manager in step 88 to generate associated outputs of the automatically developed computer software. The computer-generating, computer-coding, and saving steps may all performed in real-time so that the computer software is developed in real-time.

In all these self-optimizing systems, the machine continuously gives the best variables combinations or true setpoints, but also the teaching or learning system dynamics models to be used. From these models, relevant control equations can be set up and, if simple, solved with the relevant control constants (e.g., PID constants) determined for use on conventional automation systems.

The exact growth or recovery mechanisms of some of these variables may not be easily sensed,. but their bottom-line effects on growth or recovery conditions on the living object or overall financial gains are usually monitorable, often by the computer itself such as in learning, training, growing, or even innovating, imagining, thinking, and hypothesizing processes.

Control systems for vehicles such as cars, trucks, airplanes, ships, etc., can be similarly designed. These vehicles require the feeding of materials (variables) such as fuel, air, water (in the radiator), oil (for cooling and lubrication), etc., under the best rates, temperatures, pressures, procedural or environmental variation, etc. Again, the combustion reactions, vital functions of the engines, and other operational and performance parameters can be rapidly and accurately sensed, monitored, controlled or actuated with commercially readily available sensors or actuated.

Figure 6:
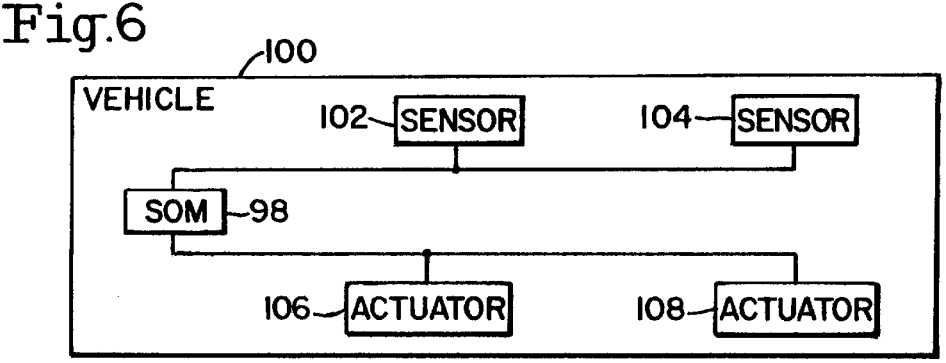
FIG. 6 illustrates a second use of the disclosed self-optimizing machine for vehicular applications.

As shown in FIG. 6, a self-optimizing machine (SOM) 98 may be embodied in a processor and/or computer system installed in a vehicle 100, which processes data from a plurality of sensors 102, 104 to self-optimize to optimally control a plurality of actuators 106, 108.

Useful operational parameters for the car or other transportation vehicles include temperature, pressure, proximity, vibrations, flow rates, etc. at a specified location in the car. The operational performance may be measured by miles per gallon, type and amount of emission pollutants, operating characteristics such as car acceleration, steering, braking, the riders' comfort, and automatic vehicular guidance.

Is A preferred self-optimizing system for actively suppressing noises at a designated receiving point on a car continuously performs n self-planned tests on m acoustic variables. These variables relate to the number and location and time (x, y, z, t) of noise generators (acoustic actuators), and their time-varying but measurable (with accelerators, for example) frequency, amplitude, and noise waveforms. The instantaneous optimum variables combination is the one that produces a combined counternoise which best minimizes the noises to be suppressed.

In an automobile, truck, or airplane, the various noises may come from the engine, tires, wheels, or wings thereon and also from environment (wind, rain, snow, ice, traffic, other cars, etc.). Four microphones as the noise generators may be located at the four corners inside the automobile, and the object of the optimization is to minimize the noise at the position of the receiving ears of the driver or a particular passenger or to passengers.

A similar system may be designed to actively suppress or control the vibrations (from the engine, shock absorbers, road irregularities, and environment factors) on the car. In a preferred embodiment, four vibration actuators are installed at the four tires or wheels. The noises, vibrations, and comfort levels can be electronically monitored using various computer-connected sensors. The sensors and actuators, commercially readily available, respectively sense and control the shock, vibration, acceleration, or even the comfort level, and medical or physiological conditions of one or more particular occupants in the car, as sensed by acceleration or pressure sensors.

For human applications, many biofeedback instruments or devices are also available for monitoring, e.g., blood pressure on the arm or leg, electrical conductance or resistance between fingers, brain waves sensed on the head or forehead, and heart conditions as sensed on the chest. All these and other such devices or instruments including surface electromyograph, electrocardiograms, EEG, which are widely used to monitor or sense the skin conductance, heart rate, blood volume pulse or respiration, electrodermal activity, and various body functions. As shown elsewhere, various computer-controlled sensors and actuators are commercially available from different sources. More details of these vehicular control systems have been given in the U.S. Pat. No. 4,368,509.

To search or screen among thousands or millions of drugs, or combinations of drugs, for a few or a few combinations that can cure a critical disease such as cancer or AIDS, my sequential screening technique given in the Journal of American Statistical Association, VOL. 57, pp. 455–477, 1962, may be used, as has been disclosed in my U.S. Pat. No. 4,368,509 referred above. In this way, optimum combinations of drugs can be systematically researched and found by the disclosed self-optimizing method and machine. The optimal combination drugs are continuously delivered to the patient in real-time, in a manner similar to the application with the furnace 20 as described above for FIG. 2. In this embodiment, banks of epidermic needles suck in, by actuators similar to 21–27 in FIG. 2, automatically controlled amounts of various liquid drugs for mixing in a common mixing container of the furnace 20. Magnetic imaging techniques can now quantitatively monitor the exact and minute biochemical reactions taking place in real-time.

The flowchart for the above drug-searching system is the same as that shown in FIG. 3. Multiple sensors sense numerical data (having much higher information content than yes-no question-answers in prior art expert systems) on the systems and product or service qualities (performances) and also on the many interacting, independent or controlling variables in various categories such as designs, procedures, equipment, materials, parts, equipment design, and environment. With this information fed by telecommunication lines such as 19 in FIG. 2, the microprocessor (e.g., 28 in FIG. 2) instantly and automatically plans by computer automated planning (CAP) efficient statistical experiments around an experimental point in the m-dimensional experimental region according to, e.g., designs of the highly fractional replicate type as shown in the U.S. Pat. No. 4,368,509 and the Worksheet paper given in Chemical Engineering, Apr. 2, 1958. Without interrupting the system in the performance of its assigned tasks, i.e., automatic manufacturing or servicing, the computer-planned designed experiments are executed automatically by a CAE procedure to achieve successively the required combinations of variable settings (or elemental compositions) through, e.g., the feeders 21–27 in FIG. 2 for computer automated testing (CAT). Test results on the dependent or controlled variables (e.g., drug effectiveness, hot tensile strength, growth rate, or noise suppression) or other system and product/service performance data are continuously, automatically, and instantly analyzed and optimized or maximized by computer automated optimization (CAO) and computer automated checking (CAC), based on specified or computed optimizing criteria, such as the various system and task goals in proper weighing indices for a particular situation. More specifically, the instantaneous optimal variables combinations, e.g., elemental compositions, drug combinations, or best condition, are continuously determined and, through actuators, are set and reset.

Self-optimization gives the conditions in learning, optimal comfort in a transportation vehicle, maximum learning or mental growth, etc. are achieved when the student is in the most relaxed condition. Relaxation not only reduces stresses and stress-related disorders, but improves concentration, physical and mental growth, and also human cognition, thinking, creating, innovating, and imagining.

Even conventional automation systems may use the self-optimizing method. For example, the numerical values of PID control constants on conventional automation equipment, normally specified by the human experts, may now be determined by rigorous self-optimizing experiments according to the flowchart in FIG. 3 and the procedure chart of FIG. 4. For specific combinations of materials, procedures, environment, equipment, etc. control variables are determined to achieve the self-optimized performance as to cost, productivity, and product or service qualities.

The U.S. Pat. No. 4,368,509 discloses the specific software to compute the "effect" or partial derivatives of the m variables on an m-dimensional performance response surface. These derivatives provide the basis for climbing the performance response mountain along the steepest ascent path, to reach the instantaneous optimum point in the m-dimensional experimental region via the method fully described in the prior art, particularly the U.S. Pat. No. 4,368,509 and my Worksheet paper referred to therein. Alternatively, the microprocessor can instantly rank the n test results to determine the optimum performance on test k which, by definition, has the instantaneous optimum variables combination. The next self-optimizing cycle, if needed, will then involve more automatic R&D, performed at a known pre-specified computer-recorded time, preferably around this new experimental point represented by test k.

While computers are many times more reliable and millions times faster than human beings, they may still lack some capabilities. In some cases, an automation manager such as a project or team leader, school teacher, corporate president, ship captain, battle commander, governmental or institutional directors, or even another computer, may provide some critically needed current financial, marketing, geopolitical, etc. information for better optimization. Deteriorating financial markets, changing oil prices, degrading weather or other environmental conditions, rapidly rising stock markets, new customers, wars or natural disasters necessitating new rules, regulations, constraints, and limitations, etc., often radically change the supply-and-demand configurations, and require a new "instantaneous optimum variables combination". The human or machine automation manager must then direct the automation process by, e.g., re-prescribing the specified performance to be optimized, providing new weighing indices for the same cost/productivity/quality mixes, and using the automatically developed computer software under the control of the automation manager. The automation manager may also interact with the self-optimizing system by, e.g., reading the three of four options on the display monitor picturing the relative risks and rewards of the options, selecting the best option based on the most current demand and supply situation, and directing the system to re-optimize.

The U.S. Pat. No. 4,368,509 also teaches a method to determine the interaction or combined effects, couple (i,j), of any two variables i, j of the m variables. These interactions are generally negligible, particularly when the units of change of the m variables are small and linear effects predominate, as is usually the case.

All the sensed system, product, and/or service performance data are then evaluated to see if the system is optimized. If not, the above optimizing cycle is repeated. If optimized, operation of the system is continued, with 100% continuous and automatic checking or quality control (CAC or CQC) of all the sensed performance data for 100% traceability.

The results of the data analyses in the CAO and CAC steps can be real-time displayed or printed-out on a word-processor in the form of research papers/reports or operating manuals describing comprehensive statistical experiments; instantaneous, complex system dynamics; functional relationships between the control variables and the system and product or service performances; new and realistic specifications on these performances; best system modifications and operating procedures; optimal raw material compositions, vendors, lots, and conditions; best equipment, factory, or plant design and layout; and other rapidly generated, reliable, but low-cost knowledge bases. These knowledge bases, including the self-optimized, numerical values of PID control constants on conventional automation equipment, are stored in the computer memory for subsequent computer or human use in, e.g., testing new hypotheses, designing improved products, systems, or software, and the like.

Note that such displays or print-outs are not for the raw sensed data, as is usually the case. Rather, they are extremely useful and commercially valuable conclusions from the comprehensive and systematic (e.g., self-optimized experimental results on 127 control variables), relevant, and exactly but automatically executed R&D. Most of such information will be totally new and not obtainable for months or years by teams of specialists because of the combinatorial explosion problems mentioned above.

These knowledge bases are, furthermore, manufactured in great bulk at very low cost, and are instantly machine-codeable so that "expert system" can be easily generated at a small fraction of the cost and time compared to the conventional approach. The development of expert systems is a well-developed art. See, for example, P. Klahr's book on "Expert Systems: Techniques, Tools, and Applications," published by Addison-Wesley in 1986; and W. B. Genarter's paper entitled: "Expert Systems: Limited but Powerful," in IEEE Spectrum, August, 1983.

Each expert system typically has as its components the knowledge base, an inference engine, a knowledge acquisition module, and explanatory interface. The self-optimizing machine always has a knowledge-acquisition module to generate, in the CAO and CAC steps, the required knowledge bases in a particular domain of interest. These knowledge bases are automatically codeable into an inference engine to provide "advises" as its outputs. In the steel-making furnace operation given above, for example, the machine-generated rules may be: "IF hot strength is needed, THEN in the order of decreasing effectiveness one should increase V, Cr, Mo, Nb, and C, but decrease Mn and Ni" (See "Effect" column in Example of the Worksheet reference); "IF maximum percentage effect is needed, THEN one should add V"; and "IF maximum hot strength is needed, THEN use the following best combination of the seven elements: 10.4% Cr, 1.2% Ni, 0.66% Mo, 0.18% V, 0.58% Nb, 0.24% Mn, and 0.80 % C", as indicated in line 25, Trial 11 of Example 1 of the Worksheet reference. Also, "IF V is 0.18% and Cr is 10.4%, THEN Mo should be 0.66% and NB 0.24%". These rules can easily be codified and printed u0 out with standard formats requiring merely the filling in of the variable names such as Cr, Ni, Mo, etc. and the numerical values such as 10.4, 1.2, 0.66, etc.

Thus, the self-optimizing machine readily and automatically generates these and other similar rules in computer-coded form, and as instant machine expert systems, are ready for various human and machine use. These displays, print-outs, and transmitted data (FIG. 3) provide the "explanatory interface," as in the conventional expert systems.

To fully utilize my self-optimizing machine, however, these expert "rules" are preferentially instantly and automatically implemented through actuators without introducing any delays or errors due to the presence of humans in the loop.

Even probabilistic statements in the rules can be provided, if needed, because the automatic statistical experiments during each self-optimizing or R&D cycle provides a valid "experimental error," from which 80%, 90%, 95%, or 99% confidence limits can be derived for the resultant optimized performances. The errors in each effect or interaction of the control variables can also be estimated. See standard textbooks on statistics.

In this way, the disclosed self-optimizing method and machine solves the main bottleneck in the prior art in the development of expert systems, i.e., the acquisition of knowledge in computer-usable form; and meets the keenly felt need to automate the knowledge generation process.

Thus, the machine-generated information of this invention forms the basis of a new kind of artificial intelligence or knowledge bases. These knowledge bases are comprehensive in the number of control variables (e.g., 127), the range of these variables (e.g., 16 test conditions for each variable as shown below), and the scope of the experimental region. In addition, these knowledge bases are relevant, timely, reliable, accurate, and possibly instantly available; and can therefore be used not only by other automation systems but by the human experts themselves.

Note that the self-optimizing process is performed on the very automation machine or object of interest and in actual operation, with the exact design, materials, parts, procedures, equipment, and environment. In addition, the test data are quickly collected, analyzed, and used on the very machine or object to be optimized during the same actual operation. Hence, the various ever-present and often critical errors of sampling, extrapolations, scaling-ups, and statistical fluctuations, are minimized or eliminated.

For the most common statistical factor designs, $n=2^k$, where k is an integer greater than or equal to 2. The number of control variables, m, must be less than n. For maximum efficiency, $m=n-1$. In this case, the n test results provide an average test results plus m effects for the m variables. Nonlinear cases requiring quadratic, cubic, etc. effects, in addition to the linear or main, effects, m must be less than n-1. Complicated cases involving many interacting control variables require still more tests to provide the interactions. The computations of the main or linear effects (or partial derivatives) and two-variable interactions are given in the Worksheet paper and also in the computer program given the U.S. Pat. No. 4,368,509. More complicated cases are covered in standard textbooks on statistics.

In the steel manufacturing example, given above and also in the Worksheet paper referred above, n=8 and m=7. The Worksheet paper also gives a parts processing example, with n=4 and m=3. Statistically designed by machines (CAP), even these simple design matrices can achieve useful with efficiency, because of the perfect balance and orthogonality of the statistical designs.

The statistical experimentation procedures of this invention, based on the inventor's tens of years of practical engineering experience in various industries, adopt an actually scientific "show me" attitude, by not blindly following the "human experts" whose knowledge base is often costly, insufficient, inaccurate, out-of-date, error-prone, etc., as discussed above The self-optimizing method can eliminate the many tedious and boring work for almost all human handlers, allowing these people to do what they are best, namely, to invent, imagine, create, innovate, and hypothesize. On these human activities, even the fastest computer cannot compete.

A unique feature of the self-optimizing technology is that the computing time in each self-optimizing or automatic R&D cycle may take only milliseconds or microseconds, as will be shown. Delays due to mass and thermal inertia or diffusion effects, however, generally are much larger than this negligible computing time. These motioning, positioning, heating, cooling, and stabilizing delays in the various sensing, actuating, and testing steps primarily determine the duration of each automatic R&D or self-optimizing cycle. Still, with suitable actuators, sensors, and equipment design or layout, the optimizing cycles may indeed be very short. These short or even instant optimizing cycles make the optimizing process not only simple and possibly, but in. real-time and often practically continuous, even for complex, rapidly changing conditions or processes involving hundreds or thousands of control variables.

Because of the efficient statistical designs and simplified data analyses, the CAP-CAE-CAT-CAO optimizing cycles may each take only a small fraction of a minute or second, if the testing, actuating, and data sensing have minimal delays. As a specific example, dealing with a case involving m=127 variables at two levels each normally would require making $n=2^{127} \approx 1.701 \times 10^{38}$ conventional tests, and about $N=3 \times n \times n \approx 8.684 \times 10^{76}$ multiplications, or about $2.752^{60}$ years on a nanosecond computer for the data analyses. Using the technique described here and in the U.S. Pat. No. 4,368,509, it now requires only 128 (n=127+1) instead of $2^{127}$ tests, and $N=n \times (\text{logarithm of n to the base of 2})=n \times \log_2 {}_{n=} 128 \times 7=$ 896 additions/subtractions and 128 divisions or 896 shifts to the right, for a total of 1,024 or 1,792 computational steps, and so about 1.02 or about 1.79 microseconds, respectively, on the same nanosecond computer. Even on a microsecond computer, the total data analysis time for each self-optimizing cycle with 127 variables is merely about 1.02 or about 1.79 milliseconds, respectively. The CAP step also takes about 1 microsecond or millisecond on the respective nanosecond or microsecond computer. Hence, if sensing, actuating, and testing (CAE and CAT) are nearly instantaneous, the entire optimizing cycle or system response time could thus indeed be a fraction of a minute or second, even down to milliseconds or microseconds. The optimizing cycle time is at least sufficiently fast to meet the requirements of practically all modern technologies.

The disclosed self-optimizing method and machine thus makes many "impossibly complex" optimizing tasks not only possible but practical and possibly in real-time.

In operation, the human or machine automation manager first gives the disclosed self-optimizing method and machine on the machine or product or service performance with their different weighing indices, and the number of control variables with their allowable ranges. It is then totally up to the new machine, all by itself, to continuously plan, execute, compute, optimize, and implement the instantaneous optimal variable combinations or automatically determined setpoints. The self-optimizing system can thus continuously optimize the quality, precision, productivity, and efficiency of many automated mass production or servicing machines.

Any pre-existing knowledge bases, if available, are used merely in the preliminary design for each variable in the first self-optimizing or automatic R&D cycle only. If no knowledge bases are available, the self-optimizing machine starts the preliminary design for each variable with an average, or a midpoint, or even a random number within, the given allowable range. After the first cycle, comprehensive, relevant, timely, and error-free new knowledge bases will be produced. Even these new knowledge bases will, in turn, most likely be immediately replaced by still newer and more accurate knowledge bases with additional self-optimizing cycles. As shown above, each such self-optimizing cycle may be very short if rapid electro-optical sensing, actuating, and testing are possible.

As a by-product to its regular manufacturing or servicing, the system thus generates vast quantities of error-free, constantly updated, and otherwise unavailable and very expensive knowledge bases. These knowledge bases are suitable for human uses for innovations, imaginations, hypotheses testing, and advanced product development. These knowledge bases are also useful for prior art automation systems, as preliminary designs for these self-optimizing machines.

This transfer of intelligence from machine to humans or to other machines may signal the beginning of the Third Industrial Revolution.

Advantages of the self-optimizing machine are many, particularly when compared to the prior art automation systems. The purpose of prior art automation systems is to control only certain selected variables within pre-specified limits. These limits may not be optimal, as shown above. Even the selected control variables do not always certainly or reliably affect the productivity and product or service cost and qualities, since much depends on the reliability of the knowledge bases; the numerous assumptions, extrapolations, and statistical variations; and equipment conditions, calibrations, and drifts.

On the other hand, the disclosed self-optimizing method and machine optimize directly and certainly to obtain the bottom line, i.e., productivity, cost, and product or service qualities ($P^3Q$). Improper control models or constants, and variable setpoints can do little harm. Because of the unique operation flowchart (FIG. 3), many of the deficiencies of prior art systems are minimized or eliminated. In particular, the condition of the sensors and actuators have minimal effects on achieving the desired optimization of the bottom line, as will be shown below.

When the control variables are sensed with miscalibrated sensors or set with imperfect actuators, for example, the resultant "instantaneous optimal combinations" as sensed with the miscalibrated sensors and set with the imperfect actuators are still the most relevant, useful and, in fact, the best for the particular self-optimizing machine at the specific time with the particular environment and machine conditions to achieve the required optimizing criteria or goals. The miscalibrations and imperfections are always exactly self-compensating.

For example, in the conventional system, the specified setpoint may be 500° C., to be sensed by a K-type or Chromel-Alumel thermocouple. If, however, the K-type thermocouple is miscalibrated or if a J-type Iron-Constantan thermocouple is misused, the results can be dangerous in prior art automation systems. However, in my self-optimizing machine, the zero and proportionality constant calibrations of the thermocouple are unimportant. Even a misuse of the thermocouple merely changes the proportionality constant with a proportional change in the apparent "effect," but no reduced efficiency in reaching the optimized bottom line results as to profits, productivities, and product qualities. Also, sensing profits in U.S. dollars, British pounds, or Japanese yens is equally effective, because maximum profits in dollars is also maximum profits in pounds, german marks, or Japanese yens.

As another example, a prior art automatic processing system may specify an optimal control temperature of 100° F. Assume a Fahrenheit thermometer is specified for sensing, but a Centigrade thermometer is misused with a zero-point correction off by 32° F. and a proportionality constant off by $((9/5)-1)=0.8=80\%$. The controlled process will then be out of control. Still, in my self-optimizing machine, the automatic R&D will determine and set at the self-determined, true instantaneous optimal combinations (or setpoints). The response surface will still be climbed in the steepest ascent manner, even though this response surface has been shifted laterally (because of the zero miscorrection) and has a different height scale (because of a changed proportionality constant).

Sensor zero miscalibration of more than 32° F. or (32/100=32%) of the optimal set value and proportionality miscalibration of more than 80% in temperature, pressure, voltages, current, dimensions, velocities, flow rates, etc. can be similarly tolerated. Actuator or other equipment imperfections due to drags, frictions, backlashes, damages, and too wide clearances are also tolerable for similar reasons. In addition, the effect of sensor noises, actuator friction, and periodic disturbances or environmental changes are also minimized because of the statistical averaging effects between tests of the same or different self-optimizing cycles.

Similarly, equipment drifts are also tolerable if the automatic R&D cycle time (e.g., 1 sec. or 2.5 sec.) is less than the drift cycle time (e.g., 5 or 10 sec.).

Hence, with the disclosed self-optimizing method and machine, achieving the truly meaningful bottom-line, optimizing goals on product or service costs or qualities is no longer a hostage to the quality of the existing knowledge bases, competency of human operators, the correctness of the control models or equations, the exactness of the given setpoints, and the conditions of the equipment.

The self-optimizing machine is thus flexible and errors tolerant or fault-tolerant. It can handle practically any number of important, possibly important, or interacting variables, on the most reliable microprocessors, without much regard to the computing speed or memory size. Redundancy of parallel processing may, however, be also employed for additional reliability and computer speed, respectively.

The disclosed self-optimizing method and machine are, therefore, smarter; better; smaller; lighter; faster; and more reliable or flexible than prior art automation systems, yet may save enormously for its employers while mass-producing low-cost but uniformly optimal-quality products or services.

Most importantly, the self-optimizing machine can timely perform the necessary, complicated optimizing tasks for the modern, complex yet rapidly changing automation tasks that the other systems fail.

Further, even the minimum number of tests in each R&D cycle still provides virtual statistical replications, and thus yields averaging effects to counter the statistical fluctuations and chance combination effects due to sampling, actuator backlashes, and equipment conditions, etc. This is partly because the efficient statistical designs are so balanced that the effect of each control variable can be independently evaluated as if the entire experiment were performed just for this one variable with the other variables all kept constant.

The self-optimizing machine parallelly and automatically performs, depending on need, at least a few of the following important operations during each automatic R&D or self-optimizing cycle:

1. Comprehensive and. systematic R&D;
2. Optimal manufacturing designs or servicing procedures;

3. 100% quality control;
4. Procedure or equipment modifications;
5. Materials and parts selections;
6. Use of environmental changes for maximum benefits;
7. Prototype or finished products manufacturing; and
8. Rapid generation of reliable and comprehensive knowledge bases.

Thus, this new machine should be significantly improved over conventional prior art automation systems, such as shown in FIG. 1. These later systems perform the various tasks list above sequentially and successively, and even this very slowly, inefficiently, and often unreliably.

The self-optimizing method and machine of the invention can be used for many automation systems in various industries including manufacturing, servicing, office, military, farming, medical, and education. The self-optimizing method is also useful for other financial, business, office, factory, military, educational, and scientific applications. Even many computer software applications can thus be not only automatically but optimally generated, modified, and used. Here, the same flowchart of FIG. 3 is used. The optimizing criteria here are the usual productivities, product or service costs, profits, and reliability or accuracy. The control variables mostly are different procedures, equipment, and software parts. The physical material and environment variables are often unimportant. The many procedural variables may involve the different merging and interacting of various programs or parts of the same program; use of different mathematical or physical/chemical models, equations, or formulas; numerical computational techniques such as for finite element analyses, differentiation or integration, interpolation or extrapolation, root-determining, in different software. The procedures or parts variables may also involve the finite element grid shape and size; number, location, and contents of the various subroutines; and the location, size, starting and finishing points, and step size of the DO loops. The equipment variables are often important because each microprocessor, disk or tape drive, monitor, printer, modem, transmission line, etc. has unique operating or performance characteristics such as speed, memory size, reliability, operating cost, etc.

The number of control variables in software optimization can also be very large. A simple, 500-line computer program may, for example, contain 20 DO loops. As indicated above, each DO loop may have three variables: the starting and ending points and the step size. In addition, these variables can be varied at many, not just two, levels or conditions. Varying only these three variables in all the 20 DO loops but at 16 levels each would require $16^{60} \approx 1.767 \times 10^{72}$ tests for the complete factor experiment. Hence, the combinatorial explosion problem again exists. Yet many, many other variables may still be added. To study the variables at 16 levels each, the same fractional factor design matrix given in the U.S. Pat. No. 4,368,509 may be used but with four parameters assigned to each of the control variables. This is so because $2^4=16$.

Again, for the self-optimizing machine, the software optimizing task such as for software generation, usage, or maintenance, computer simulation, and computer aided design (CAD), engineering (CAE), or testing (CAT), etc. is first defined. The optimizing criteria of the usual cost, productivity, and quality, in different weighing indices are next given. The number, type, and allowable range of the variables in different categories are then fed. As shown, this fed information may include the number, type, location, operating characteristics, etc. of the different co-processors or on-site slave microprocessors, monitors, disk or tape drives, telecommunication equipment, modems, printers, etc.; and the number, type, and characteristics of the different subroutines, DO loops, or numerical analytical methods; etc.

It is then again up to the master processor in the self-optimizing machine to continuously and automatically plan (CAP) or automatically and instantly plan (AIP), and direct the various optimizing steps such as CAE, CAT, CAO, and CAC and, in addition, repeat the self-optimizing or automatic R&D cycles as needed. The effect of using a particular equipment, procedure, or software part is then determined, and the interactions of the variables are computed. One or more of the optimizing schemes described above are followed. The optimal combination of the variables is determined and set, redetermined and reset, so that the software generation, modification, maintenance, application, etc. tasks are optimized statically, or continuously in dynamic situations. In these software-related tasks, no physical products are manufactured or serviced, yet the results are just as rewarding. These results may be, e.g., self-optimized CADesign; CAEngineering; CAManufacturing; computer integrated instruction (or training); simulation; product design; software debugging; marketing; advertising; accounting; selling; data conversion, compression, or decompression; information encoding or decoding; signal or image processing; sensor data fusion; communication; networking; personal management; reconnaissance; surveillance; command and control; weapon delivery; battle management; automatic defense; geopolitical assessments; financial data analyses; and stock, option, and commodity trading strategy generation and execution.

As another example, a new, multimedia computer and software can be developed to provide to an object or receiver continuously varying but controlled sound, smell, lighting, temperature, humidity, pressure on the object or entity (e.g., hot or cold breeze, jets, or wind), text and moving or still pictures on the monitor display, and brain-teasing, mind-relaxing, muscle-exercising, etc., materials or equipment, and other factors that stimulate the object physically, mentally, psychologically, and physiologically. Designed and operated according to my self-optimizing method, this multimedia computer can be used to achieve an integrated, instantaneously optimal effect on the physical, mental, psychological, or physiological condition of the object or receiver.

As shown elsewhere, many modern biofeedback and neurofeedback, devices, already interfaced with the computer, are widely available to quantitatively and simultaneously measure and monitor body temperature, even cognitive activity and performance, stress, EMG, EKG, (alpha, beta, theta) brain waves, heart rate, blood volume pulse, skin conductance, respiration, or even complex patterns of physiologic activity, e.g., the physical, mental, psychological, or physiological conditions of the object.

These special instruments or devices are currently used by psychologists, physicians, nurses, physical and occupational therapists, speech pathologists, social workers, marriage/family counselors, dentist, chiropractors, and many other associated health professional positive results have already been achieved in both inpatient and outpatient programs. Their uses and value in education, learning, training, assessment, sports physiology and training or performance enhancement, relaxation, stress relief, etc. have already been proved. Further, most of these instruments can already be connected within one minute with various computers including: COMPAQ, DELL, AST, DATATRAIN, PACKARD BELL, AND TOSHIBA, COMPAQ, WINBOOK, IBM computers or laptop computers.

Available operation and application software or systems often limit the capabilities of computers. With the self-optimizing method, disk or computer operation systems can be made to have self-optimized software to optimally turn, on and off, a set of chips and circuit boards into a most efficient working brain. As a self-optimizing entity, this activated brain can respond to instructions in the best manner, according to such usual criteria as speed, efficiency, and reliability.

Application software are put into the operation system to make the computer to perform specific tasks, like processing words, constructing spreadsheets, doing income taxes, engineering designs, processing or manufacturing, managing an institution, an office, a plant, business, or project. The application software can be similarly self-optimized, by itself or as used on a special computer for a particular task.

The pre-specified optimizing criteria for a computer software generation, modification, use, maintenance, or performing a specific function may be a feature selected from the group consisting of performance characteristics, power, portability, cost of development, productivity, smallness, accuracy, efficiency, utility, reliability, robustness, maintainability, flexibility, memory requirement, output quality, and computing or analyzing speed.

In the self-optimizing technology, the computer self-plans computerized experiments on the different control variables of various categories. The computer then directs the execution of the planned experiment, analyzes the experiment results to compare the performance characteristics of the various combinations of the selected control variables to determine the improving or optimizing variable combination, codes the thus-determined combination in computer-usable form, and saves the coded computer software onto a memory disc. The computer often also acts as both the various sensors and actuators.

No one knows well about how to program parallel computers. But applying the self-optimizing technology to a simple computer program or a commercially available program, such as "MS-DOS" available from "MICROSOFT", "LOTUS 1-2-3" available from "IBM", "WORDPERFECT" available from "COREL", etc., more efficient, clever, and error-free programs may be produced after several self-optimizing cycles of software modification and improvement. These new programs are the result of automatic software R&D that systematically and comprehensively searches, experiments, and analyzes the equivalent of millions or billions of new test programs. This is impossible with the prior art methods of program generation and evolution because of the necessarily slow, unreliable, and costly human involvement. When human-computer, computer-computer, computer-software, software-accessories interactions exist, the combinatorial explosion problem becomes even more serious and the self-optimizing methodology is necessary.

There is a new technology called "artificial life" being developed to create software whose behavior mimics living entities. The newly produced computer programs can actually evolve into more powerful programs through their own interaction and merging to create a new generation by a Darwinian evolution process similar to that of biological organisms. Such evolution could produce software more reliable than that designed by human programmers, who cannot anticipate all the potential ways in which their software can fail. The Darwinian biological evolution through natural selection and survival of the fittest took, for example, millions of years, to only a partial success.

The self-optimizing method is more reliable and powerful than the Darwinian approach. For example, the $16^{60}$ tests (or nodes in the 60-dimensional experimental region or space) indicated above to search or design an optimized (not just improved) 500-line instruction program containing 20 DO loops cannot be handled without the continuous automatic planning (CAP) of fractional factor experiments. The savings in simulation or search tests is not just 10, 100, 1000 times, but $10^{69}$ times. A modern financial, industrial, or military computer program may contain over 5 million or 10 millions instructions, necessitating the use of the self-optimizing method.

The statistically designed experimental plan is highly reproducible. Even with highly fractional factor experimentation, the automatic R&D can systematically and efficiently search or analyze the entire m-dimensional region or space, in a non-random, reliable, and uniform manner, for determining that variables combination which improves or optimizes the performance criterion.

As shown above, the computerized automatic experimentation for, for example, software development or steel making (FIG. 2) contains a series of computer-planned and computer-executed, self-optimizing experiments. Each such experiment involves a set of n statistically designed software tests planned to center around a specified experimental point in the m-dimensional space, for testing in these n tests the m selected control variables to determine their effects or best combination on the software performance.

Typically, $n=2^k$ in which k is an integer equal to at least 1, while the integer m must be less than n. Hence the number of selected control variables, m, can be any integer from 2 to n−1. For maximum efficiency, m should be n−1, as shown in the examples given above in the steel-making example (FIG. 2) given in the referred Li's Worksheet.

Note that even a single self-optimizing experiment of n tests on m variables will generally more comprehensive R&D results or knowledge bases than what is now available. The experiment not only is highly systematic, reliable, and efficient, but also covers a very wide range dealing with, e.g., m variables. When m is above 5, these experiments cannot be performed by error-prone human experimental planners, executioners, analyzers, commanders, reporters, etc.

For instant knowledge acquisition, prototype modeling, and software development, management, improvement, usage, reuse, or error, defect, and virus detection and elimination, the self-optimizing methodology when applied to rapid will not merely improve after numerous time-consuming searching, learning, or adapting trials and errors, but systematically and effectively optimize in real-time, the performance as to cost, productivity, accuracy, reliability, and availability, maintainability, and human-computer interfacing. Real-time software design, development, testing, implementation, and maintenance is therefore possible. The resultant self-optimizing systems will also methodically test and diagnose every component of a system and identify performance problems before they arise, optimally determine or reallocate current resources, and decide on future capacity requirements. In many situations, this new methodology will be able to quickly process information and perform decision aid tasks.

According to the disclosed self-organizing method and machine of the invention given above, I have developed a real-time self-optimizing heating system or machine. This machine has, a 64 KB of memory, controlled by an APPLE II Plus computer, a Lindberg Type 54032 or 55035 furnace, a Chromel-Alumel thermocouple sensor, and a 25-ampere Omega solid-state relay as the actuator. A 3¾-bit analog-to-digital (A/D) converter, a special parallel interface board, and some transmission lines complete the hardware. This machine does not work on a fixed, control program based on preconceived heating dynamics model, predetermined control constants, and setpoints, as is usually the case. Rather, the APPLE II Plus computer plans its own test design matrix according to the technique described above; directs the relay actuator to be on and off at planned temperatures for designed lengths of times according to the design matrix; collects and analyses the sensed temperature data to determine, with or without the use of the steepest ascent method, the instantaneous, unique combination of the variables which optimizes the machine performance, e.g., minimum temperature fluctuations, absolute temperature deviations from the set temperature, time to reach set temperature, etc.; and sets the machine accordingly. The control (e.g., PID) constants may also be continually self-optimized in cases where the system dynamics and control equation are well-defined. Even with the large thermal inertia, within minutes of turning on the machine is heated to and controlled within typically a fraction of a degree Centigrade from the set temperature of, e.g., 500° C. The sensitivity on this machine is limited by the A/D converter. Some other real-time self-optimizing machine have also been developed and successfully tested.

In addition, the U.S. Pat. No. 4,368,509 also points out the various relevant prior arts including Hardaway's extreme parameter search control system (U.S. Pat. No. 3,446,430), Russo's combined pattern recognition and linear regression network (U.S. Pat. No. 3,576,976), Smith's digital process control (U.S. Pat. No. 3,694,636), and Barron's control system (U.S. Pat. Nos. 3,460,096 and 3,519,998) which provide background for the design and use of control systems, system programming, actuators, calculators, timing circuits, A/D or digital-to-analog (D/A) converters, storage memories, sensors, comparators, logic devices, sign detectors, etc. which are often useful in the practice of my invention. Li's other patents, including U.S. Pat. Nos. 4,472,770, 4,710,864, and 4,910,660, 5,079,690, and 5,410,634 also describe different aspects of the self-optimizing method and machine. The aforesaid U.S. patents are incorporated herein by reference.

While the disclosed automatic computer software development system and method is particularly shown and described herein with reference to the preferred embodiments, it is to be understood that various modifications in form and detail may be made without departing from the scope and spirit of the present invention. Accordingly, modifications such as any examples suggested herein, but not limited thereto, are to be considered within the scope of the present invention.

What is claimed is:

1. A method for automatically developing computer software according to a specified performance of an entity selected from the group consisting of the computer software, a task for developing or using the computer software, a processor, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, the method comprising the steps of:

computer-generating a knowledge base associated with the computer software;

instantly computer-coding the computer-generated knowledge base into the computer software;

saving the developed computer software into a software storage device; and using the automatically developed computer software as directed by the automation manager;

the computer-generating, computer-coding, and saving steps being all performed in real time so that the computer software is developed in real time;

wherein the computer-generating step includes the steps of:

computer-planning at least one computerized, self-improving or self-optimizing experiment on a plurality of selected control variables associated with the computer software;

computer-executing the computer-planned experiment;

employing sensors in the at least one computer-planned and computer-executed experiment to sense a plurality of data on the specified performance of the entity;

employing actuators in the at least one computer-planned and computer-executed experiment to actuate a plurality of actuatable entities associated with the specified performance;

computer-analyzing, in real time, results of the computer-planned and computer-executed experiment to determine and to set a combination of the control variables which improves or optimizes the specified performance using predetermined optimizing criteria; and performing the at least one self-improving or self-optimizing experiment on the plurality of the selected control variables, with real-time continuous feedback to supply design data, when needed, for immediate computer-replanning, computer-reexecution, and computer-reanalyzing, to achieve closed-loop feedback control; and wherein the at least one self-improving or self-optimizing experiment is performed on the very particular entity to be optimized.

2. The method of claim 1 wherein the computer-analyzing step further includes the steps of:

determining the experimental error the self-improving or self-optimizing experiment; and deriving confidence limits based on the determined experimental error.

3. The method of claim 1 wherein the computer-analyzing step comprises determining at least one time-serial effect of the control variables at different computer-recorded times for the various self-improving or self-optimizing cycles.

4. The method of claim 1 further comprising the steps of:

operating a nanosecond computer for performing the computer-generating, computer-coding, and saving steps so that the computer software is developed within one minute; and applying designed statistical experimentation methodology in the computer software development, thereby achieving a manifold improvement, as compared to human software development, in at least one development performance goal selected from the group consisting of development cost, development time, and reliability of the developed software.

5. The method of claim 1 wherein the step of using the automatically developed software includes the step of using the developed computer software to achieve, in a living object, an improved or optimal activity selected from the group consisting of mental, physical, psychological, physiological, body growth, physical strengthening, sports, learning to speak, singing, reading, swimming, memorizing, relaxing, enjoying, being stimulated, being entertained, and mastering a foreign language.

6. The method of claim 1 wherein said entity is a living object and including employing at least one computer-connected biofeedback device as a sensor to achieve an optimal activity selected from the group consisting of mental, physical, psychological, physiological, body growth, physical strengthening, sports, learning to speak, singing, reading, swimming, memorizing, relaxing, enjoying, being stimulated, being entertained, and mastering a foreign language.

7. The method of claim 1 wherein the step of using the automatically developed software includes the step of causing the computer-developed software to achieve an instantaneously improved or optimal performance of the physical, mental, psychological, or physiological condition of a living object; and wherein the control variables are selected from the group consisting of time-varying type, tempo, intensity, or frequency of a sound or noise; smell; lighting; temperature; humidity; pressure on selected parts of the object including hot or cold breezes, jets, and wind; video and audio signals; brain-teasing, mind-relaxing, and muscle-exercising materials or equipment; and factors that stimulate or change the object physically, mentally, psychologically, or physiologically.

8. The method of claim 1 wherein the step of using the automatically developed software includes the step of causing the computer-developed software to achieve a task selected from the group consisting of generating, modifying, testing, using, maintaining, improving, and optimizing a computer software;

wherein the specified performance is associated with at least one system or task goal selected from the group consisting of cost, productivity, accuracy, efficiency, reliability, maintainability, smallness, utility, robustness, flexibility, memory requirement, output quality, computing or analyzing speed, and human-computer interacting; and wherein the computer-generating step includes performing at least one self-improving or self-optimizing experiment on a multitude of control variables selected from the group consisting of equipment including the number, type, location, and operating characteristics of at least one co-processor or on-site slave microprocessor, monitor, disk or tape drive, telecommunication equipment, modem, and printer; software parts; mathematical or physical/chemical models, equations, or formulas; numerical computational techniques including those for differentiation or integration, interpolation or extrapolation, and root-determining; finite element grid shape and size; number, location, and contents of various subroutines in the software; and location, step size, and starting point and ending point of DO loops in the software; and merging and interacting of various computer programs or parts of the same computer program.

9. The method of claim 1 wherein the step of using the automatically developed software includes the step of causing the computer software to optimize a specific task selected from the group consisting of manufacturing; servicing; marketing; selling; managing; educating or training; stimulation, relaxing, being entertained or multi-media conditioned of a living object; engineering; reverse-engineering; designing; distribution; R&D; decision making; running a parallel computer; multimedia computing; electronic data interchanging; computer operation and application; processing words; constructing spreadsheet; doing income tax return; engineering design; prototype modeling; simulation; battle management; signal or image processing; sensor data fusion; communication; telecommunication; reconnaissance; surveillance; command and control; weapon delivery; automatic defense; geopolitical assessment; financial data analysis; noise and vibration suppression; stock, option, and commodity trading strategy generation and execution; and software management, improvement, usage, reuse, and error, defect, and virus detection and elimination.

10. The method of 1 including the step of providing a nanosecond computer with biofeedback sensors and actuators to stimulate the human brain to optimally create, innovate, imagine, think, or hypothesize.

11. The method of claim 1 wherein the sensor employing step comprises employing at least one biofeedback monitor to sense at least one brain wave of a human subject.

12. The method of claim 1 wherein the sensor employing step comprises employing at least one biofeedback monitor to sense relative proportions of alpha, beta, and theta brain waves of a human subject.

13. The method of claim 1 including employing biofeedback sensing techniques to optimally relax a human subject and to achieve maximum mental concentration.

14. The method of claim 1 wherein the step of performing includes the step of:

causing the automatically developed computer software to be capable of learning based on computer-controlled feedback.

15. The method of claim 1 wherein the step of performing includes the step of:

developing the automatically developed computer software based on incomplete knowledge of the automation manager with respect to operating system dynamics of the entity.

16. The method of claim 1 wherein the entity is an automation system for planning and executing the self-improving or self-optimizing experiment, for sending the experimental results to a first computer to predict what processing steps are to be taken, and for determining and setting the control variables to a combination corresponding to an optimal result of the automation system.

17. The method of claim 1 further comprising the step of:

manipulating the behavior of the entity through computer-controlled feedback.

18. A method for automatically developing computer software according to a specified performance of an entity selected from the group consisting of the computer software, a task for developing or using the computer software, a processor, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, the method comprising the steps of:

computer-generating a knowledge base associated with the computer software;

instantly computer-coding the computer-generated knowledge base into the computer software;

saving the developed computer software into a software storage device; and using the automatically developed computer software as directed by the automation manager;

the computer-generating, computer-coding, and saving steps being all performed in real time so that the computer software is developed in real time;

wherein the computer-generating step includes the steps of:

computer-planning at least one computerized, self-improving or self-optimizing experiment on a plurality of selected control variables associated with the computer software;

computer-executing the computer-planned experiment;

computer-analyzing in real time results of the computer-planned and computer-executed experiment to determine and to set a combination of the control variables which improves or optimizes the specified performance using predetermined optimizing criteria; and;

performing the at least one self-improving or self-optimizing experiment on the plurality of the selected control variables, with real-time continuous feedback to supply design data, when needed, for immediate computer-replanning, computer-reexecution, and computer-reanalyzing to achieve closed-loop feedback control; and wherein the at least one self-improving or self-optimizing experiment is performed on the very particular entity to be optimized;

the entity is a computer having a plurality of electronic components for the operation of the computer software;

the specified performance is an operational performance of the computer software when run on the computer under predetermined conditions, and is associated with the efficiency of the computer operating with the computer software in response to predetermined instructions; and the control variables are associated with an operating status of a selected set of the electronic components on the computer.

19. A method for automatically developing computer software according to a specified performance of an entity selected from the group consisting of the computer software, a task for developing or using the computer software, a processor, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, the method comprising the steps of:

computer-generating a knowledge base associated with the computer software;

instantly computer-coding the computer-generated knowledge base into the computer software;

saving the developed computer software into a software storage device; and using the automatically developed computer software as directed by the automation manager;

the computer-generating, computer-coding, and saving steps being all performed in real time so that the computer software is developed in real time;

wherein the computer-generating step includes the steps of:

computer-planning at least one computerized, self-improving or self-optimizing experiment on a plurality of selected control variables associated with the computer software;

computer-executing the computer-planned experiment;

employing sensors in the at least one computer-planned and computer-executed experiment to sense a plurality of a performance data of the entity;

employing actuators in the at least one computer-planned and computer-executed experiment to actuate a plurality of actuatable entities associated with the specified performance;

computer-analyzing, in real-time, results of the computer-planned and computer-executed experiment to determine and to set a combination of the control variables which improves or optimizes the specified performance using predetermined optimizing criteria; and performing the at least one self-improving or self-optimizing experiment on the plurality of the selected control variables, with real-time continuous feedback to supply design data, when needed, for immediate computer-replanning, computer-reexecution, and computer-reanalyzing to achieve closed-loop feedback control; and wherein the at least one self-improving or self-optimizing experiment is performed on the very particular entity to be optimized; and further comprising the steps of:

employing sensors in the computer-planned and computer-executed experiments to sense a plurality of vehicular characteristics and operational data; and employing actuators in the computer-planned and computer-executed experiments to actuate a plurality of actuatable entities on a transportation vehicle and associated with the specified performance;

wherein the entity is the transportation vehicle to be improved or optimally controlled;

the specified performance is associated with at least one of the vehicular operating characteristics and operational data; and the control variables are selected from the group consisting of design variables, material and parts variables, equipment variables, procedure variables, and environmental variables.

20. A method for automatically developing computer software according to a specified performance of an entity selected from the group consisting of the computer software, a task for developing or using the computer software, a processor, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, the method comprising the steps of:

computer-generating a knowledge base associated with the computer software;

instantly computer-coding the computer-generated knowledge base into the computer software;

saving the developed computer software into a software storage device; and using the automatically developed computer software as directed by the automation manager;

the computer-generating, computer-coding, and saving steps being all performed in real time so that the computer software is developed in real time;

wherein the computer-generating step includes the steps of:

computer-planning at least one computerized, self-improving or self-optimizing experiment on a plurality of selected control variables associated with the computer software;

computer-executing the computer-planned experiment;

performing the at least one self-improving or self-optimizing experiment on the plurality of the selected control variables, with real-time continuous feedback to supply design data, when needed, for immediate computer-replanning, computer-reexecution, and computer-reanalyzing to achieve closed-loop feedback control; and wherein the at least one self-improving or self-optimizing experiment is performed on the very particular entity to be optimized; and wherein:

the computer software is used to actively suppress noise or vibration from at least one noise or vibration generator;

the specified performance is associated with total combined noises or vibrations at a designated receiving point;

the selected control variables include a plurality of acoustic control variables selected from the group consisting of design variables, material and parts variables, equipment variables, procedure variables, and environmental variables; and the computer-planned and computer-executed experiments repeatedly determine and set the respective optimal variable combinations which, at respective time instants, produce the total combined noises or vibrations which minimize the noises and vibrations to be actively suppressed.

21. The method of claim 20 wherein:

the at least one noise or vibration generator is a transportation vehicle selected from the group consisting of automobile, truck, aerospace vehicle, ship, and railroad car; and the noises or vibrations come from a plurality of sources selected from the group consisting of vehicular engine, tires or wheels, shock absorbers, road irregularities, and environment including wind, rain, snow, ice, and traffic arising from transportation vehicles.

22. A machine for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory onto which the computer software is designed to apply, the computer software being automatically developed to minimize human software development, the specified performance being pre-specified by a human or machine automation manager prior to the computer software development, and the computer software being used by the automation manager after the computerized automatic development is performed, the machine comprising:

a computer processor for computer-generating a knowledge base associated with the computer software;

a coding device for instantly computer-coding the computer-generated knowledge base into the computer software;

a storage device for saving the developed computer software in a memory; and a processor for using the automatically developed computer software under the control of the automation manager;

wherein the computer processor, the coding device, storage device, and processor all operate in real-time so that the computer software is developed in real-time;

wherein the computer processor includes:

an electronic computer for computer-planning at least one computerized, self-improving or self-optimizing experiment on a plurality of selected control variables associated with the computer software;

an executing device for computer-executing the computer-planned experiment;

an electronic analyzer for computer-analyzing, in real-time, results of the computer-planned and computer-executed experiment to determine and to set a combination of the control variables which improves or optimizes the specified performance;

electronic means for performing at least one self-improving or self-optimizing experiment on the plurality of the selected control variables, with real-time continuous feedback to supply design data, when needed, for immediate computer-replanning, computer-reexecution, computer-reanalyzing, and re-performing to achieve closed loop automatic feedback control; and wherein the self-improving or self-optimizing experiment is performed on the particular entity to be optimized; and further comprising:

sensors employed in the computer-planned and computer-executed experiments to sense a plurality of vehicular operational data; and actuators employed in the computer-planned and computer-executed experiments to actuate a plurality of actuatable entities on the vehicle and associated with the specified performance;

and wherein:

the entity is the transportation vehicle to be optimally controlled;

the specified performance is associated with a vehicular operating characteristic; and the control variables are selected from the group consisting of design variables, material and parts variables, equipment variables, procedure variables, and environmental variables.

23. A machine for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory onto which the computer software is designed to apply, the computer software being automatically developed to minimize human software development, the specified performance being pre-specified by a human or machine automation manager prior to the computer software development, and the computer software being used by the automation manager after the computerized automatic development is performed, the machine comprising:

a computer processor, for computer-generating a knowledge base associated with the computer software;

a coding device for instantly computer-coding the computer-generated knowledge base into the computer software;

a storage device for saving the developed computer software in a memory; and a processor for using the automatically developed computer software under the control of the automation manager;

wherein the computer processor, the coding device, storage device, and processor all operate in real-time so that the computer software is developed in real-time;

wherein the computer processor, includes:

an electronic computer for computer-planning at least one computerized, self-improving or self-optimizing experiment on a plurality of selected control variables associated with the computer software;

an executing device for computer-executing the computer-planned experiment;

an electronic analyzer for computer-analyzing in real-time results of the computer-planned and computer-executed experiment to determine and to set a combination of the control variables which improves or optimizes the specified performance;

electronic means for performing the at least one self-improving or self-optimizing experiment on the plurality of the selected control variables, with real-time continuous feedback to supply design data, when needed, for immediate computer-replanning, computer-reexecution, computer-reanalyzing, and re-performing to achieve closed-loop feedback control; and wherein the self-improving or self-optimizing is performed on the particular entity to be optimized;

and wherein the entity is a computer including a plurality of electronic components for the operation of the computer software;

the specified performance is an operational performance of the computer software when run on the computer under predetermined conditions, and is associated with the efficiency of the computer operating with the computer software in response to predetermined instructions; and the control variables are associated with an operating status of the computer.

24. A machine for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory onto which the computer software is designed to apply, the computer software being automatically developed to minimize human software development, the specified performance being pre-specified by a human or machine automation manager prior to the computer software development, and the computer software being used by the automation manager after the computerized automatic development is performed, the machine comprising:

a computer processor for computer-generating a knowledge base associated with the computer software;

a coding device for instantly computer-coding the computer-generated knowledge base into the computer software;

a storage device for saving the developed computer software in a memory; and a processor for using the automatically developed computer software under the control of the automation manager;

wherein the computer processor, the coding device, storage device, and processor all operate in real-time so that the computer software is developed in real-time;

wherein the computer processor includes:

an electronic computer for computer-planning at least one computerized, self-improving or self-optimizing experiment on a plurality of selected control variables associated with the computer software;

an executing device for computer-executing the computer-planned experiment;

an electronic analyzer for computer-analyzing, in real-time, results of the computer-planned and computer-executed experiment to determine and to set a combination of the control variables which improves or optimizes the specified performance;

electronic means for performing at least one self-improving or self-optimizing experiment on the plurality of the selected control variables, with real-time continuous feedback to supply design data, when needed, for immediate computer-replanning, computer-reexecution, computer-reanalyzing, and re-performing; and wherein the self-improving or self-optimizing is performed on the particular entity to be optimized; and further comprising:

sensors employed in the computer-planned and computer-executed experiments to sense a plurality of data on the specified performance of the entity; and actuators employed in the computer-planned and computer-executed experiments to actuate a plurality of actuatable entities on the entity and associated with the specified performance; and wherein:

the specified performance is associated with an operating characteristic of the entity; and the control variables are selected from the group consisting of design variables, material and parts variables, equipment variables, procedure variables, and environmental variables.

25. A machine for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory onto which the computer software is designed to apply, the computer software being automatically developed to minimize human software development, the specified performance being pre-specified by a human or machine automation manager prior to the computer software development, and the computer software being used by the automation manager after the computerized automatic development is performed, the machine comprising:

a computer processor for computer-generating a knowledge base associated with the computer software;

a coding device for instantly computer-coding the computer-generated knowledge base into the computer software;

a storage device for saving the developed computer software in a memory; and a processor for using the automatically developed computer software under the control of the automation manager;

wherein the computer processor, the coding device, storage device, and processor all operate in real-time so that the computer software is developed in real-time;

wherein the computer processor includes:
an electronic computer for computer-planning at least one computerized, self-improving or self-optimizing experiment on a plurality of selected control variables associated with the computer software;
an executing device for computer-executing the computer-planned experiment;
an electronic analyzer for computer-analyzing, in real-time, results of the computer-planned and computer-executed experiment to determine and to set a combination of the control variables which improves or optimizes the specified performance;
electronic means for performing at least one self-improving or self-optimizing experiment on the plurality of the selected control variables, with real-time continuous feedback to supply design data, when needed for immediate computer-replanning, computer-reexecution, computer-reanalyzing, and re-performing to achieve closed-loop feedback control; and wherein the self-improving or self-optimizing is performed on the particular entity to be optimized; and wherein
the computer software is used to actively suppress noise and/or vibrations from at least one noise and/or vibration generator;
the specified performance is associated with total combined noises or vibrations received from the at least one generator at a designated receiving point;
the selected control variables include a plurality of acoustic control variables selected from the group consisting of design variables, material and parts variables, equipment variables, procedure variables, and environmental variables; and
the computer-planned and computer-executed experiments repeatedly determine the respective optimal variable combinations which, at respective time instants, minimize the total combined noises or vibrations to be actively suppressed.

26. The machine of claim 25 wherein:
the at least one noise and/or vibration generator is a transportation vehicle selected from the group consisting of automobile, truck, aerospace vehicle, ship, and railroad car; and
the noises or vibrations come from a plurality of sources selected from the group consisting of vehicular engine, tires or wheels, shock absorbers, road irregularities, and environment including wind, rain, snow, ice, and traffic arising from transportation vehicles.

27. A machine for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory onto which the computer software is designed to apply, the computer software being automatically developed to minimize human software development, the specified performance being pre-specified by a human or machine automation manager prior to the computer software development, and the computer software being used by the automation manager after the computerized automatic developed is performed, the machine comprising:

processor means for:
a) computer-generating a knowledge base associated with the computer software;
b) instantly computer-coding the computer-generated knowledge base into the computer software;
c) saving the developed computer software in a memory; and
d) using the automatically developed computer software as directed by the automation manager;

wherein the processor means performs the steps of computer-generating, computer-coding, saving, and using the automatically developed software in real-time so that the computer software is developed in real-time;

wherein the processor means for computer-generating the knowledge base includes electronic means for:
1) computer-planning at least one computerized, self-optimizing experiment on a plurality of selected control variables associated with the computer software;
2) computer-executing the computer-planned experiment;
3) computer-analyzing in real-time results of the computer-planned and computer-executed experiment to determine and to set a combination of the control variables which improves or optimizes the specified performance using a predetermined optimizing criterion; and
4) performing at least one self-optimizing experiment on the plurality of the selected control variables, with real-time continuous feedback to supply design data, when needed, for immediate computer-replanning, computer-reexecution, computer-reanalyzing, and re-performing to achieve closed-loop feedback control; and wherein:

the self-optimizing experiment is performed on the particular entity to be optimized; and further comprising:
sensors employed in the computer-planned and computer-executed experiments to sense a plurality of vehicular operational data on the controlled variables; and
actuators employed in the computer-planned and computer-executed experiments to actuate a plurality of actuatable entities on the vehicle and associated with the specified performance.

28. A method for automatically developing computer software for a mental activity of a human subject selected from the group consisting of creating, imagining, thinking, inventing, hypothesizing, and innovating;
wherein the computer software is optimized according to a specified performance of the human mental activity, and is automatically developed to minimize human software development;
the specified performance being pre-specified prior to the computer software development by a human or machine automation manager, the computer software being used by the automation manager after the computerized automatic development is performed, the method comprising the steps of:
selecting a plurality of control variables which affect the human activity;
performing computerized automatic research-and-development on the specific performance affected by the plurality of selected control variables;

employing at least one biofeedback monitor to sense at least one specified performance of the human mental activity;

computer-generating a knowledge base associated with the human activity;

instantly computer-coding the computer-generated knowledge base to thereby develop the computer software; and using the automatically developed computer software as directed by the automation manager; and saving the developed computer software in a software storage device;

wherein the computer-generating, computer-coding, and saving steps are all performed in real-time so that the computer software is developed in real-time; and wherein the computer-generating step includes the steps of:

computer-planning the at least one computerized, self-improving or self-optimizing experiment on a plurality of selected control variables;

computer-executing the at least one computer-planned experiment;

computer-analyzing, in real-time, the results of the computer-planned and computer-executed experiment for determining and setting a combination of the control variables which improves or optimizes the specified performance using predetermined optimizing criteria; and performing at least one self-improving or self-optimizing experiment on the plurality of the selected control variables, with real-time continuous feedback to supply design data, when needed, for immediate computer-replanning, computer-reexecution, and computer-reanalyzing to achieve closed-loop feedback control.

29. The method of claim 28 further comprising:

the step of using biofeedback techniques to optimally relax the human subject in order to induce concentration in the mind of the human subject, thereby causing the human subject to excel in the mental activity.

30. A method for automatically optimizing a mental activity of a human subject according to a specified performance, the mental activity being selected from the group consisting of creating, inventing, imagining, thinking, hypothesizing, and innovating, with the specified performance being pre-specified prior to the mental activity optimization by a human or machine automation manager and the optimal mental activity development being performed under the control of the automation manager, the method comprising the steps of:

selecting a plurality of control variables which affect the specified mental activity of the human subject;

applying a biofeedback monitor for sensing at least one specified performance of the human mental activity;

performing computerized automatic research-and-development on the specific performance as affected by the plurality of the selected control variables;

employing at least one actuator to actuate at least one actuatable entity in the step of performing the automatic research-and-development;

computer-generating a knowledge base associated with the human activity; and using the automatically developed computer software under the control of the automation manager.

31. A method for automatically developing computer software according to a specified performance of an entity to be optimized comprising:

performing on the particular entity a plurality of self-improving or self-optimizing experiments on a plurality of selected control variables, with real-time continuous feedback to supply design data for immediate computer-replanning, computer-reexecution, and computer-reanalyzing; wherein the entity is a computer having a plurality of electronic components for the operation of the computer software;

the specified performance is an operational performance of the computer software when run on the computer under predetermined conditions, and is associated with the efficiency of the computer operating with the computer software in response to predetermined instructions; and the control variables are associated with an operating status of the computer.

32. A machine for automatically developing computer software according to a specified performance of an entity to be improved or optimized, the machine comprising:

electronic means for performing on the particular entity to be optimized at least one self-improving or self-optimizing experiment on a plurality of selected control variables; and feedback means for performing real-time continuous feedback to supply design data, when needed, to the electronic means for immediate computer-replanning, computer-reexecution, and computer-reanalyzing to achieve closed loop feedback control; and wherein:

the entity is an automation system for planning and executing the self-improving or self-optimizing experiment for sending the experimental results to a first computer to predict what processing steps are to be taken, and for determining and setting the control variables to a combination corresponding to an optimal result of the automation system.

33. The machine of claim 32 wherein the electronic means includes:

means for performing, on the particular entity to be improved or optimized, a plurality of self-improving or self-optimizing experiments on the plurality of selected control variables; and wherein the feedback means includes means for performing real-time continuous feedback to supply design data to the plurality of self-improving or self-optimizing experiments for immediate computer-replanning, computer-reexecution, and computer reanalyzing.

34. The machine of claim 32 wherein the electronic means includes:

means for developing the automatically developed computer software to be capable of learning based on computer-controlled feedback.

35. The machine of claim 32 wherein the electronic means includes:

means for developing the automatically developed computer software based on incomplete knowledge of the automation manager with respect to the system dynamics.

36. The machine of claim 32 further comprising:

means for manipulating the behavior of the entity through computer controlled feedback.

37. A method for automatically developing computer software according to a specified performance of an entity to be optimized, the method comprising:

performing, on the particular entity to be improved or optimized, a first computerized automatic research-and-development (R&D) experiment;

actuating in the first computerized automatic R&D experiment a plurality of actuatable entities associated with the specified performance;

sensing in the first computerized automatic R&D experiment to produce first automatic R&D test results;

computer-analyzing, in real time, the computer-produced first automatic R&D test results to generate a first computer-generated knowledge base;

computer-coding the first computer-generated knowledge base into a first computer-developed software; and causing the first computer-developed software to self-learn through a computerized automatic feedback R&D process to provide a second computer-generated knowledge base and to computer-develop a second computer-developed software; and using the second computer-developed software on an entity under the control of the automation manager.

38. A machine for automatically developing computer software according to a specified performance of an entity selected from the group consisting of:

the computer software;

a task for developing or using the computer software;

an automation system;

a living or non-living object selected from the group consisting of human, animal, plant, bacteria, instrument, equipment, and a machine or factory onto which the computer software is designed to apply;

the computer software being automatically developed to minimize human software development, the specified performance being pre-specified by a human or machine automation manager prior to the computer software development, and the developed computer software being used by the automation manager after the computerized automatic development is performed, the machine comprising:

means for performing, on the particular entity to be improved or optimized, a first computerized automatic research-and-development (R&D) experiment;

means for actuating in the first computerized automatic R&D experiment a plurality of actuatable entities associated with the specified performance;

means for sensing in the first computerized automatic R&D experiment to produce first automatic R&D test results;

means for computer-analyzing, in real time, the computer-produced first automatic R&D test results to generate a first computer-generated knowledge base;

means for computer-coding the first computer-generated knowledge base into a first computer-developed software; and means for causing the first computer-developed software to self-learn through a computerized automatic feedback R&D process to provide a second computer-generated knowledge base and to thereby computer-develop a second computer-developed software; and means for using the second computer-developed software for improving or optimizing the performance of the entity under the control of the automation manager.

39. A method for automatically developing computer software according to a specified performance of an entity selected from the group consisting of the computer software, a task for developing or using the computer software, a processor, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, the method comprising the steps of:

computer-generating a knowledge base associated with the computer software;

instantly computer-coding the computer-generated knowledge base into the computer software;

saving the developed computer software into a software storage device; and using the automatically developed computer software as directed by the automation manager;

the computer-generating, computer-coding, and saving steps being all performed in real time so that the computer software is developed in real time;

wherein the computer-generating step includes the steps of:

computer-planning at least one computerized, self-improving or self-optimizing experiment on a plurality of selected control variables associated with the computer software;

computer-executing the computer-planned experiment;

employing sensors in the at least one computer-planned and computer-executed experiment to sense a plurality of a performance data of the entity;

employing actuators in the at least one computer-planned and computer-executed experiment to actuate a plurality of actuatable entities associated with the specified performance;

computer-analyzing, in real time, results of the computer-planned and computer-executed experiment to determine and to set a combination of the control variables which improves or optimizes the specified performance using predetermined optimizing criteria; and performing the at least one closed-loop self-improving or self-optimizing experiment on the plurality of the selected control variables, with real-time continuous feedback to supply design data for immediate computer-replanning, computer-reexecution, and computer-reanalyzing; and wherein the at least one self-improving or self-optimizing experiment is performed on the very particular entity to be optimized.

40. A method for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, the method comprising the steps of:

computer-generating, in real-time, a timely, reliable, and substantially error-free knowledge base associated with the computer software;

instantly computer-coding the computer-generated knowledge base into the computer software;

saving the developed computer software into a software storage device; and using the automatically developed computer software as directed by the automation manager;

the computer-generating, computer-coding, and saving steps being all performed in real time and without human guidance or intervention, to avoid humans in the automation loop whereby the computer software is automatically developed in real time; and including computer-executing at least one computer-planned self-improving or self optimizing factorial experiment, which is no more than sixteenth fractionally replicated;

employing sensors in the at least one computer-planned experiment to sense a plurality of operational data of tested variables; and employing actuators in the at least one computer-planned experiment to actuate a plurality of actuatable entities associated with the tested variables.

41. A machine for automatically developing computer software according to a specified performance of an entity selected from the group consisting of the computer software, a task for developing or using the computer software, an automation system, and a living or non-living object selected from the group consisting of human, animal, plant, bacteria, instrument, equipment, machine, and factory to which the computer software is designed to apply, the computer software being automatically developed to minimize human software development, the specified performance being pre-specified by a human or machine automation manager prior to the computer software development, and the computer software generated by the computerized automatic development being used as the automation manager desires, wherein said machine comprises:

means for computer-generating, in real-time, a timely, reliable, and substantially error-free knowledge base associated with the computer software;

means for instantly computer-coding the computer-generated knowledge base into the computer software;

means for saving the developed computer software into a software storage device; and means for using the automatically developed computer software as directed by the automation manager;

the computer-generating, computer-coding, and saving steps being all performed in real time and without human guidance or intervention, to avoid humans in the automation loop whereby the computer software is automatically developed in real time; and including means for computer-executing at least one computer-planned self-improving or self optimizing factorial experiment, which is no more than sixteenth fractionally replicated; and wherein said machine employs sensors in the at least one computer-planned experiment to sense a plurality of specified performance data of the entity; and said machine employs actuators in the at least one computer-planned experiment to actuate a plurality of actuatable entities associated with the tested variables.

* * * * *